US009256800B2

(12) United States Patent
Ushijima

(10) Patent No.: US 9,256,800 B2
(45) Date of Patent: Feb. 9, 2016

(54) TARGET LINE DETECTION DEVICE AND METHOD

(71) Applicant: FUJITSU LIMITED, Kawasaki-shi, Kanagawa (JP)

(72) Inventor: Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/547,260

(22) Filed: Nov. 19, 2014

(65) Prior Publication Data

US 2015/0178586 A1 Jun. 25, 2015

(30) Foreign Application Priority Data

Dec. 24, 2013 (JP) ................................. 2013-265957

(51) Int. Cl.
*G06K 9/00* (2006.01)
*G06K 9/46* (2006.01)
*G06T 7/00* (2006.01)

(52) U.S. Cl.
CPC .......... *G06K 9/4638* (2013.01); *G06K 9/00248* (2013.01); *G06K 9/4661* (2013.01); *G06T 7/0042* (2013.01); *G06T 7/0085* (2013.01); *G06T 2207/20136* (2013.01); *G06T 2207/30088* (2013.01); *G06T 2207/30201* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,611,036 A * | 3/1997 | Berend | .................. | G06T 11/001 345/441 |
| 5,881,171 A * | 3/1999 | Kinjo | ................. | G06K 9/00228 382/199 |
| 6,014,474 A * | 1/2000 | Takeo | .................. | G06K 9/4609 358/453 |
| 6,095,989 A * | 8/2000 | Hay | ..................... | A61B 3/0025 600/558 |
| 8,059,899 B2 * | 11/2011 | Ishimaru | ................. | G06T 5/003 382/199 |
| 8,213,720 B2 * | 7/2012 | Hu | ..................... | G06K 9/00248 382/118 |
| 8,823,829 B2 * | 9/2014 | Imai | ...................... | H04N 5/142 348/222.1 |
| 2003/0095698 A1 * | 5/2003 | Kawano | ................ | G06T 7/0083 382/132 |
| 2008/0075381 A1 * | 3/2008 | Ishimaru | ............... | G06T 7/0085 382/266 |
| 2009/0087089 A1 * | 4/2009 | Hu | ..................... | G06K 9/00248 382/165 |
| 2011/0150279 A1 * | 6/2011 | Kotake | ................. | G06K 9/4604 382/103 |

FOREIGN PATENT DOCUMENTS

| | | |
|---|---|---|
| JP | 2006-133824 | 5/2006 |
| JP | 2008-83820 | 4/2008 |
| JP | 2009-86824 | 4/2009 |

OTHER PUBLICATIONS

Patent Abstracts of Japan, Publication No. 2006-133824, published May 25, 2006.
Patent Abstracts of Japan, Publication No. 2008-083820, published Apr. 10, 2008.
Patent Abstracts of Japan, Publication No. 2009-086824, published Apr. 23, 2009.

* cited by examiner

*Primary Examiner* — Anand Bhatnagar
(74) *Attorney, Agent, or Firm* — Staas & Halsey LLP

(57) ABSTRACT

A target line detection device includes a processor configured to execute a process. The process includes: detecting transition points in a brightness image obtained from a brightness component of an input image between pixels with a luminosity gradient in a first direction and pixels with a luminosity gradient in a second direction opposite to the first direction; and, based on a shape or a length or a combination thereof, of lines connecting together transition points that are within a specific distance of each other, extracting a line representing a detection target from the lines connecting together the transition points.

12 Claims, 18 Drawing Sheets

FIG.16

| LEVEL | FACE REGION SIZE | FILTER SIZE |
|---|---|---|
| 1 | 100 × 100 | 3 × 3 |
| 2 | 150 × 150 | 5 × 5 |
| 3 | 225 × 225 | 7 × 7 |
| 4 | 337 × 337 | 9 × 9 |
| 5 | 506 × 506 | 11 × 11 |
| ... | | |

TARGET LINE DETECTION DEVICE AND METHOD

CROSS-REFERENCE TO RELATED APPLICATION

This application is based upon and claims the benefit of priority of the prior Japanese Patent Application No. 2013-265957, filed on Dec. 24, 2013, the entire contents of which are incorporated herein by reference.

FIELD

The embodiments discussed herein are related to a target line detection device, a target line detection method, and a storage medium storing a target line detection program.

BACKGROUND

An image processing method has been proposed in which the respective positions of both eyes are detected in a photographic image of a face, and a chin area including the location of the chin and a region in the vicinity of the chin is estimated based on the respective positions of the two eyes. The position of the chin is then detected within the chin area, from which non-skin colored pixels have been removed. In this image processing method, pixel values of each pixel in the estimated chin area are projected onto an axis in the vertical direction of the face, and projection data is obtained at each height in the axial direction. Edge strength is then derived for each height based on the projection data, and the positions of the pixels corresponding to the height with the greatest edge strength is determined to be the position of the chin.

A chin position computation device that computes the position of the chin from a received color image has also been proposed. In this device, a skin-colored face is detected in the color image, and, based on the detected face, a reference line is computed from a central position between the two eyes and a central position of the mouth of the face. Data expressing a statistical positional relationship between the central position between the two eyes, the central position of the mouth, and the position of the chin is acquired, and a probability for the position of the chin of the face is computed from the data expressing positional relationships and from the computed reference line. A probability for the presence of skin-colored pixels on the reference line is also computed, and a rate of change in luminosity on the reference line is also computed. The position of the chin is computed from a result of combining the respective computed probability and rate.

An image processing device has been proposed in which a luminosity difference from peripheral pixels is derived for each pixel in original image data, and an outline level that determines the luminosity of these pixels in outline image data is evaluated based on a luminosity gradient. In this image processing device, the outline levels of pixels with a luminosity gradient absolute value that is greater than a threshold value are moved in a specific direction according to the slope direction of the luminosity gradient.

RELATED PATENT DOCUMENTS

Japanese Laid-Open Patent Application No. 2006-133824
Japanese Laid-Open Patent Application No. 2009-086824
Japanese Laid-Open Patent Application No. 2008-083820

SUMMARY

According to an aspect of the embodiments, a target line detection device includes a memory and a processor configured to execute a process. The process includes: detecting transition points in a brightness image obtained from a brightness component of an input image between pixels with a luminosity gradient in a first direction and pixels with a luminosity gradient in a second direction opposite to the first direction; and, based on a shape or a length or a combination thereof, of lines connecting together transition points that are within a specific distance of each other, extracting a line representing a detection target from the lines connecting together the transition points.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a drawing illustrating an example of a table defining correspondence relationships between face region size and filter size.

DESCRIPTION OF EMBODIMENTS

Figure 1:
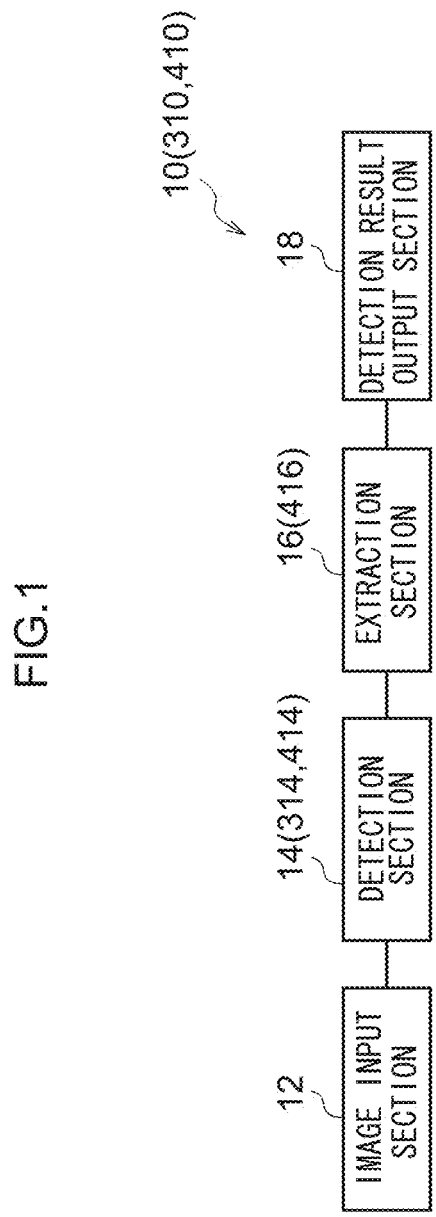
FIG. 1 is a block diagram illustrating a functional configuration of a target line detection device according to a first exemplary embodiment.

Detailed explanation follows regarding examples of embodiments of technology disclosed herein, with reference to the drawings.

First Exemplary Embodiment

First, explanation is given regarding a first exemplary embodiment. In the first exemplary embodiment, explanation is given regarding a case in which a line representing a chin that is the detection target is detected in an image of a human face.

In fields such as beauty support, for example, a face location is detected, or manually selected, in an image of a human face, and facial balance is measured based on the distances between respective facial features. One example of such facial balance measurement involves detecting the hairline, chin, and outlines of the sides of the face from an image of a face, and measuring whether or not a ratio between the length from the hairline to the chin, and the lateral width of the face, is close to an ideal value (for example, 1.46).

In such measurement, the hairline and outlines of the sides of the face can be detected based on color and luminosity differences between a face portion, a hair portion, and a background portion. However, in the case of the chin, there is little difference in color between the face portion above a line along the chin, and a neck portion below the line along the chin, since both portions are the color of skin. Moreover, unlike the eyes, for example, the chin is not a location that creates pronounced contrast, and so has weak edge strength. It is accordingly difficult to detect the chin using such methods that detect the hairline and the outlines of the sides of the face.

A method may be considered in which an edge extraction technique is applied to detect the chin from the results of an edge extraction filter by detecting groupings of pixels having an edge strength within a predetermined threshold value range for chin detection. However, the edge strength is affected by factors such as the lighting environment and background during capture, making prior setting of a threshold value enabling chin detection difficult. Note that this issue arises not only with the chin, but also when detecting lines caused by undulations in the imaging subject, such as laugh lines, that have a small color difference or luminosity contrast in images.

Note that face images employed in face balance measurement such as that described above are frequently captured in a lighting environment in which light is incident from above and to the front, such as with general indoor lighting, rather than in a photography studio capable of employing multiple light sources. Accordingly, face images captured in lighting environments in which light is incident from a single direction include regions in which luminosity increases on progression along a specific direction within the region, and regions in which luminosity decreases on progression along a specific direction within the region, resulting from differences in the way light is incident to facial undulations. Specifically, luminosity increases on progression from the top to the bottom of the face in regions where a plane projects out toward the front on progression toward the bottom of the face, and luminosity decreases on progression from the top to the bottom of the face in regions where a plane retreats toward the rear on progression toward the bottom of the face.

For example, in a portion containing the chin, light is incident differently in a face region above a line along the chin, and in a neck region below the line along the chin. As a result, a boundary between a region in which luminosity increases on progression from the top to the bottom of the face and a region in which luminosity decreases on progression from the top to the bottom of the face appears on a line representing the chin in the image.

In consideration of this point, the present exemplary embodiment detects a line representing a detection target at a location where there is a small color difference and luminosity contrast in an image.

As illustrated in FIG. 1, a target line detection device 10 according to the first exemplary embodiment includes an image input section 12, a detection section 14, an extraction section 16, and a detection result output section 18.

When a face image, in which a region containing a human face is captured, has been input to the target line detection device 10, the image input section 12 receives the input face image and passes the face image on to the detection section 14 of a later stage. The image input section 12 uses a known method to detect a face region in the input face image, in order to identify a face top-bottom direction and rotate the face image such that the face top-bottom direction matches a face image top-bottom direction. Namely, in a case in which a 90° landscape face image has been input, the image input section 12 rotates the face image by 90° to the right or to the left. The face image may be a color image, or may be a monochrome image. Note that the explanation of the present exemplary embodiment assumes the input face image to have been captured in a lighting environment in which light is incident from above and to the front.

Figure 2:
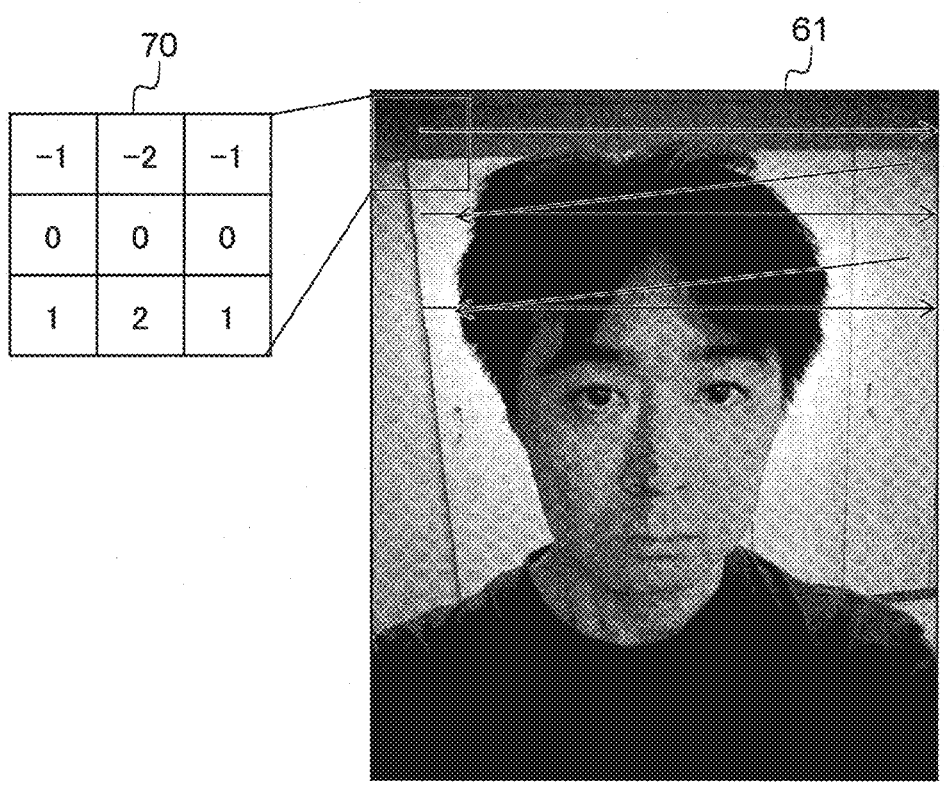
FIG. 2 is a drawing to explain computation of a luminosity gradient.

The detection section 14 generates a brightness image in which only a brightness component is extracted from the face image received from the image input section 12. The detection section 14 moreover computes a vertical direction (face image top-bottom direction) luminosity gradient strength for each pixel in the brightness image. Specifically, as illustrated in FIG. 2, the detection section 14 applies a vertical direction gradient filter 70 of a specific size (a size of 3×3 pixels in the example in FIG. 2) to a brightness image 61. Note that the face top-bottom direction is aligned with the face image top-bottom direction by the image input section 12, however if the two directions do not match, the detection section 14 may rotate the orientation of the vertical direction gradient filter 70 so as to match the face top-bottom direction in the face image before application.

As described above, the present exemplary embodiment assumes that the face image was captured in a lighting environment in which light is incident from above and to the front. Accordingly, by applying the vertical direction gradient filter 70 such as that illustrated in FIG. 2, when luminosity increases on progression toward lower pixels as viewed from a given pixel, namely when there is a downward luminosity gradient (in a direction from the top to the bottom of the face), such pixels have a luminosity gradient strength with a positive value (+). However, when luminosity increases on progression toward higher pixels as viewed from a given pixel, namely when there is an upward luminosity gradient (in a direction from the bottom to the top of the face), such pixels have a luminosity gradient strength with a negative value (−). A pixel with a positive luminosity gradient strength value is at a location where a plane of the face including the location corresponding to that pixel projects out toward the front on progression toward the bottom of the face. However, a pixel with a negative luminosity gradient strength value is at a location where a plane of the face including the location corresponding to that pixel retreats toward the rear on progression toward the bottom of the face.

Note that the upward direction and downward direction referred to above are examples of a first direction and a second direction of technology disclosed herein. The first direction and the second direction are not limited to the upward direction and the downward direction, and vary according to the detection target. Accordingly, a gradient filter having a direction according to the detection target may be applied, with luminosity gradient strength computed for the first direction and the second direction according to the detection target. Specifically, a gradient filter having a direction intersecting with a line representing the detection target may be applied.

Figure 3:
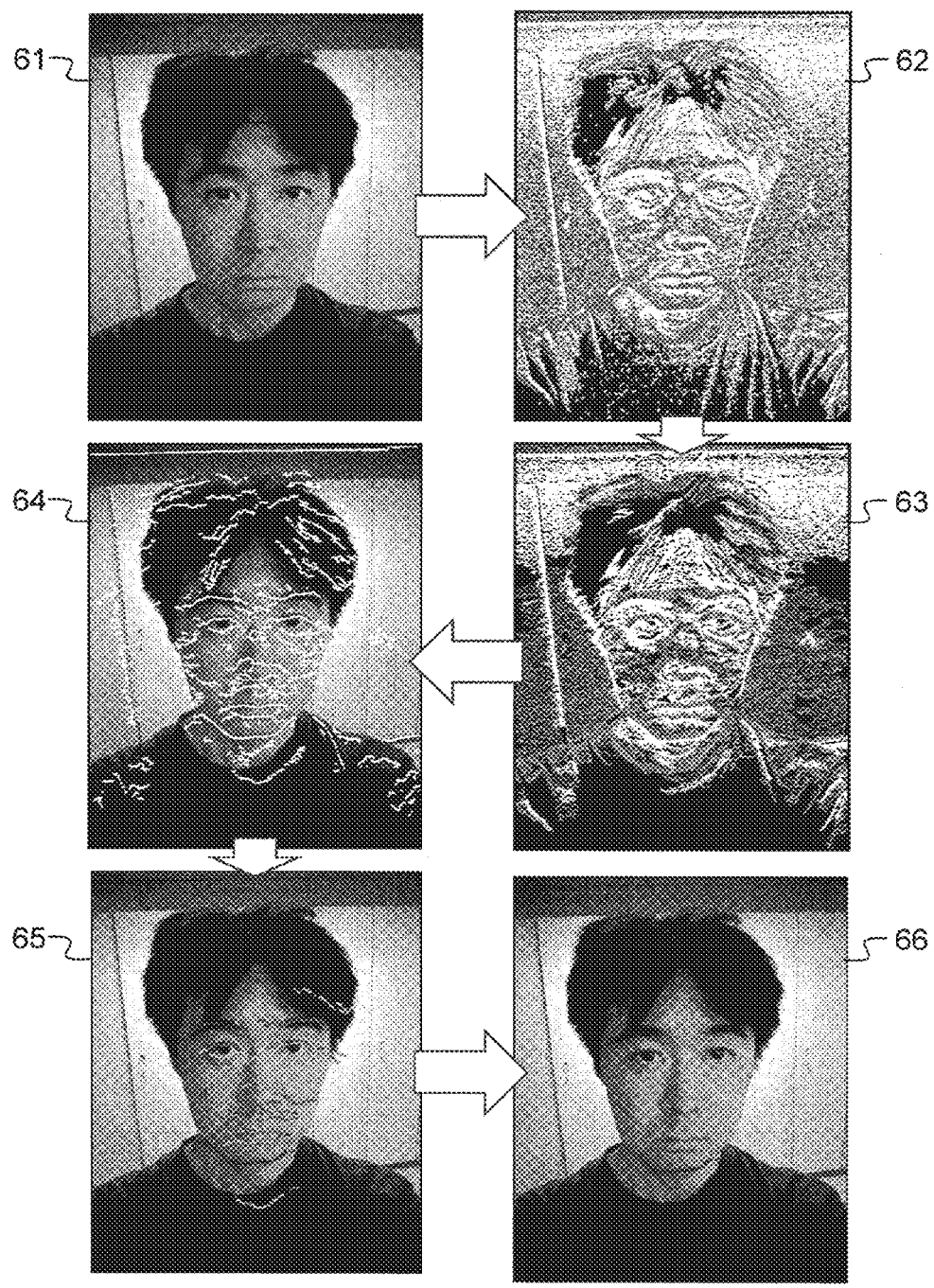
FIG. 3 is a drawing to explain detection of a line representing a chin.

As illustrated in FIG. 3, from the filter results of the vertical direction gradient filter 70 applied to the brightness image 61, the detection section 14 generates a ternary image 62 expressing three values, namely pixels with a positive value luminosity gradient strength, pixels with a negative value luminosity gradient strength, and pixels with a zero value. For example, the detection section 14 may make pixels with a positive value luminosity gradient strength 1 (white), pixels with a negative value −1 (gray), and pixels with a zero value 0 (black).

The detection section 14 moreover groups together adjacent pixels with the same pixel value in the ternary image 62 representing the filter results, in order to remove a noise component from the filter results. As illustrated in FIG. 3, the detection section 14 generates a ternary image 63 from which small regions have been removed from the ternary image 62 representing the filter results, by allocating a pixel value of 0 to pixels contained in small regions, in which the area of a grouped region is a specific size or below.

As illustrated in FIG. 3, in the ternary image 62 representing the filter results and the ternary image 63 from which the small regions have been removed, a gray pixel (negative luminosity gradient strength value) region with a white pixel (positive luminosity gradient strength value) region below the gray pixel region, is formed at a portion containing the chin. The boundary between the gray pixel region and the white pixel region appears on a line representing the chin.

In order to extract the boundary between the regions described above, the detection section 14 firstly detects transition points between pixels with an upward luminosity gradient, and pixels with a downward luminosity gradient. Specifically, from amongst the gray pixels in the ternary image 63 from which the small regions have been removed, the detection section 14 detects, and marks as pixels corresponding to transition points, any gray pixels where the pixel above the gray pixel (toward the top of the face) is also a gray pixel, and the pixel below the gray pixel (toward the bottom of the face) is a white pixel. Note that, from amongst the white pixels, the detection section 14 may also detect, and mark as pixels corresponding to transition points, any white pixels where the pixel below the white pixel (toward the bottom of the face) is also a white pixel, and the pixel above the white pixel (toward the top of the face) is a gray pixel. It is sufficient to detect boundaries between gray pixel group regions and white pixel group regions in the top-bottom direction. FIG. 3 illustrates an example of a marked image 64 in which marked pixels of the brightness image 61 have been made white pixels.

Figure 4:
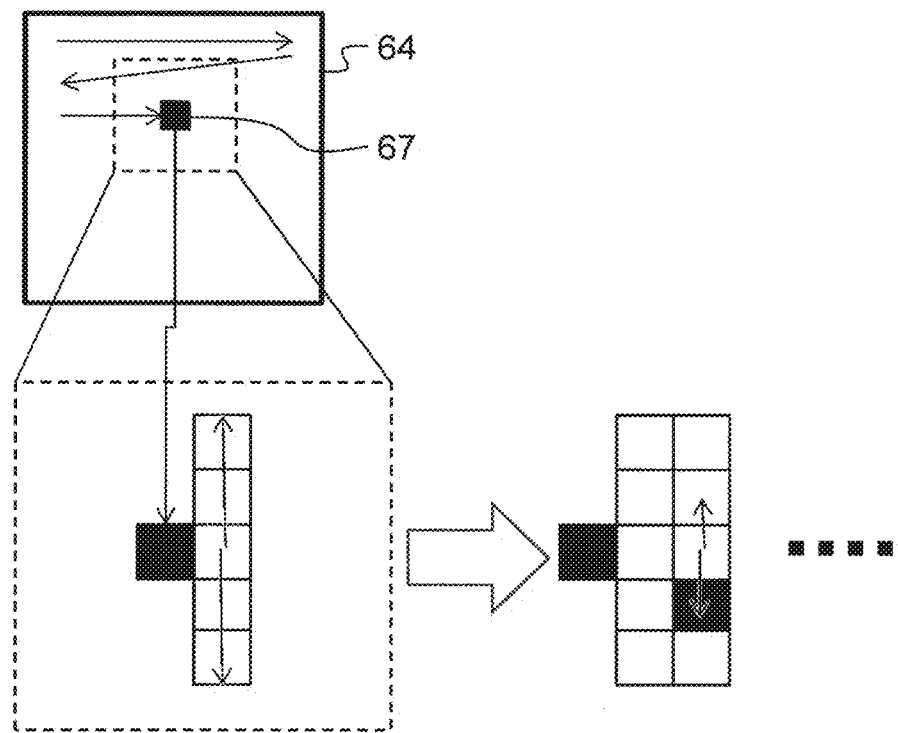
FIG. 4 is a drawing to explain extraction of a connected line.

Out of the pixels corresponding to transition points detected by the detection section 14, the extraction section 16 extracts connected lines that connect together pixels within a specific distance of each other. Specifically, as illustrated in FIG. 4, the extraction section 16 searches for a marked pixel in the marked image 64, and takes the found pixel as a start point pixel 67. The extraction section 16 then searches for marked pixels in peripheral pixels to the start point pixel 67. When a marked pixel is found, the extraction section 16 takes the start point pixel 67 and the found pixel as pixels representing the same line, and records the coordinates (pixel position, [X, Y]) of these pixels in a connected line list. The extraction section 16 then takes the found pixel as a new start point pixel 67, and repeats processing to search for marked pixels in the peripheral pixels until there are no more marked pixels to be found.

Figure 5:
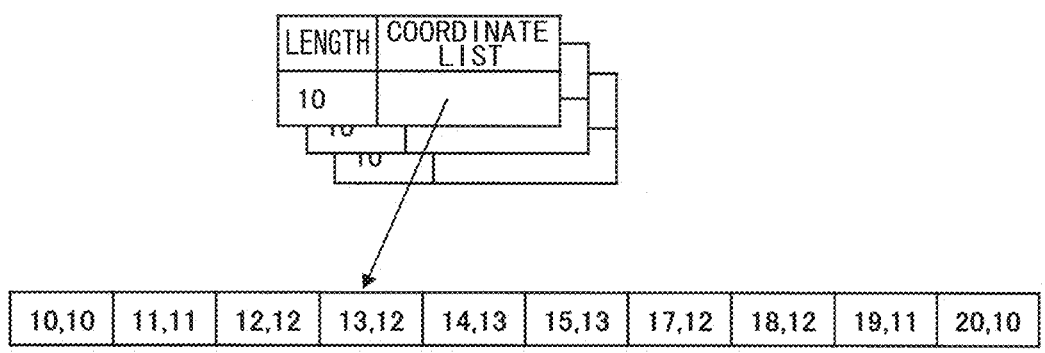
FIG. 5 is a drawing illustrating an example of a connected line list.

FIG. 5 illustrates an example of a connected line list. In the example in FIG. 5, the connected line list includes a coordinate list of the coordinates of the found pixels of each extracted connected line, respectively arranged ascending order from the smallest X coordinate value. The connected line list also includes length data for each connected line. The X direction length (the maximum X coordinate value−the minimum X coordinate value in the coordinate list) may be taken as the length of the connected line. The sum of the X direction length and the Y direction length (the maximum Y coordinate value−the minimum Y coordinate value in the coordinate list) may also be taken as the length of the connected line. The sum of distances between the adjacent coordinates may also be taken as the length of the connected line. FIG. 3 illustrates an example of a connected line image 65 in which the connected lines have been superimposed on the brightness image 61.

The peripheral pixels when searching for marked pixels may for example be 3×3 pixels or 5×5 pixels centered on the start point pixel 67, set as appropriate according to the image size and resolution of the face image, for example. Note that when the range of the peripheral pixels is set to 3×3 pixels, only mutually adjacent marked pixels are extracted as connected lines. Setting the range of the peripheral pixels to 5×5 pixels or more allows marked pixels that are separated from each other by one or more pixels to be detected as connected lines. When the peripheral pixels are set to 5×5 pixels, configuration may be made such that an initial search for marked pixels is made in a 3×3 pixel range, and then widened to a 5×5 pixel range when no marked pixels can be found.

The extraction section 16 extracts a target line representing the chin that is the detection target from out of the connected lines based on the shape or the length or a combination thereof of the extracted connected lines. Specifically, the extraction section 16 uses the coordinate lists of each of the connected lines recorded in the connected line list to extract connected lines that have a downward convex curved line shape. A downward convex curved line shape refers to a downward circular arc shape, a downward elliptical shape, or the like. From out of the extracted connected lines that have a downward convex curved line shape, the extraction section 16 uses the lengths recorded in the connected line list to extract the longest connected line as the target line representing the chin.

The detection result output section 18 outputs the target line representing the chin extracted by the extraction section 16 as a detection result. For example, as illustrated in FIG. 3, a detection result image 66 in which the target line representing the chin is superimposed on the brightness image 61 may be output.

Figure 6:
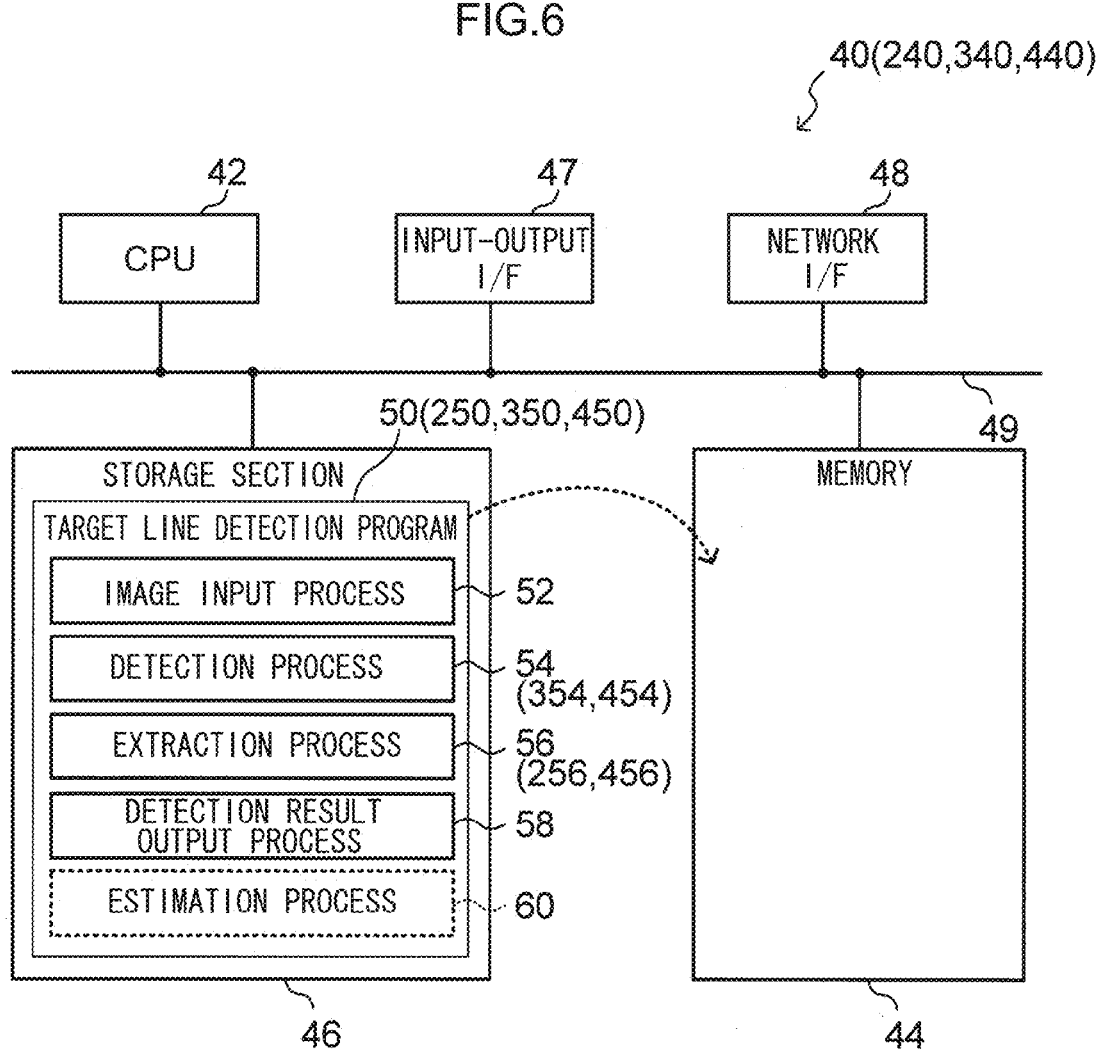
FIG. 6 is a block diagram illustrating an outline configuration of a computer that functions as a target line detection device according to the first exemplary embodiment.

The target line detection device 10 may, for example, be implemented by a computer 40, as illustrated in FIG. 6. The computer 40 includes a CPU 42, a memory 44, a non-volatile storage section 46, an input-output interface (I/F) 47, and a network I/F 48. The CPU 42, the memory 44, the storage section 46, the input-output I/F 47, and the network I/F 48 are connected together through a bus 49.

The storage section 46 may be implemented by a Hard Disk Drive (HDD), flash memory, or the like. The storage section 46, serving as a storage medium, is stored with a target line detection program 50 that causes the computer 40 to function as the target line detection device 10. The CPU 42 reads the target line detection program 50 from the storage section 46, expands the target line detection program 50 in the memory 44, and sequentially executes the processes of the target line detection program 50.

The target line detection program 50 includes an image input process 52, a detection process 54, an extraction process 56, and a detection result output process 58. The CPU 42 operates as the image input section 12 illustrated in FIG. 1 by executing the image input process 52. The CPU 42 operates as the detection section 14 illustrated in FIG. 1 by executing the detection process 54. The CPU 42 operates as the extraction section 16 illustrated in FIG. 1 by executing the extraction process 56. The CPU 42 operates as the detection result output section 18 illustrated in FIG. 1 by executing the detection result output process 58. The computer 40 executing the target line detection program 50 accordingly functions as the target line detection device 10.

Note that the target line detection device 10 may also be implemented by a semiconductor integrated circuit, for example, more specifically by an Application Specific Integrated Circuit (ASIC) or the like.

Next, explanation follows regarding operation of the target line detection device 10 according to the first exemplary embodiment. When a face image has been input into the target line detection device 10, the target line detection device 10 executes the target line detection processing illustrated in FIG. 7.

Figure 7:
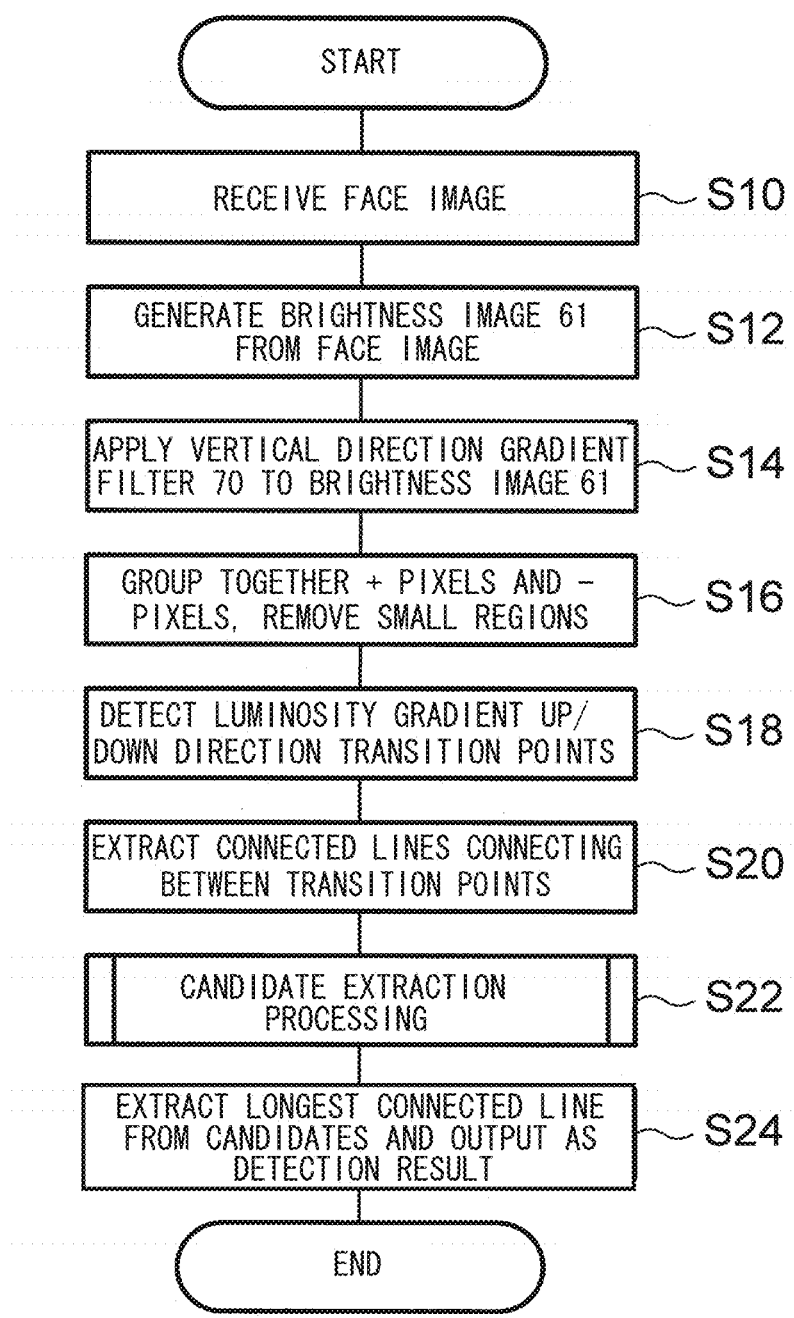
FIG. 7 is a flowchart illustrating an example of target line detection processing in the first exemplary embodiment.

At step S10 of the target line detection processing illustrated in FIG. 7, the image input section 12 receives an input face image. The image input section 12 moreover detects a face region in the input face image in order to identify the face top-bottom direction, and rotates the face image such that the face top-bottom direction matches the face image top-bottom direction.

Next, at step S12, the detection section 14 generates the brightness image 61 in which only the brightness component is extracted from the face image. Then, at step S14, the detection section 14 applies the vertical direction gradient filter 70 to the brightness image 61. From the filter results, the detection section 14 generates the ternary image 62 expressing, in ternary values, the positive luminosity gradient strength value pixels, the negative luminosity gradient strength value pixels, and the zero pixels.

Next, at step S16, the detection section 14 groups together adjacent pixels of the same pixel value in the ternary image 62 representing the filter results. In the ternary image 62 representing the filter results, the detection section 14 then allocates a pixel value of 0 to pixels contained in small regions, in which the surface area of a grouped region is a specific size or below, to generate a ternary image 63 from which the small regions have been removed.

Next, at step S18, out of the gray pixels in the ternary image 63 from which the small regions have been removed, the detection section 14 detects as pixels corresponding to transition point gray pixels where the pixel above the gray pixel (toward the top of the face) is also a gray pixel, and the pixel below the gray pixel (toward the bottom of the face) is a white pixel. The detection section 14 then marks the pixels corresponding to transition points.

Next, at step S20, the extraction section 16 searches for marked pixels (pixels corresponding to the transition points) within a specific distance of each other, and extracts connected lines connecting together the found pixels. Specifically, as illustrated in FIG. 4, for example, the extraction section 16 searches for marked pixels in a specific number of pixels (5 in the example illustrated in FIG. 4) in a right hand side adjacent column to a start point pixel 67. When a marked pixel is found, the extraction section 16 takes the start point pixel 67 and the found pixel as pixels representing the same connected line, and records the coordinates (pixel position, [X, Y]) of the pixel in the connected line list. The extraction section 16 repeats processing to search for marked pixels in the peripheral pixels using the found pixel as a new start point pixel 67.

When no marked pixels can be found, the extraction section 16 searches for a marked pixel from a specific number of pixels in the column one pixel further to the right. When no marked pixels can be found even when the search region has been widened by N rows to the right, the search to the right hand side of the first start point pixel 67 to be set is ended. The extraction section 16 then searches to the left hand side of the first start point pixel 67 to be set, similarly to the right hand side search. When the extraction section 16 has finished both the left hand side and right hand side searches, the coordinates recorded in the connected line list are arranged in ascending order from the smallest X coordinate value. The extraction section 16 then derives the length of the connected line and records the length in the connected line list.

Figure 8:
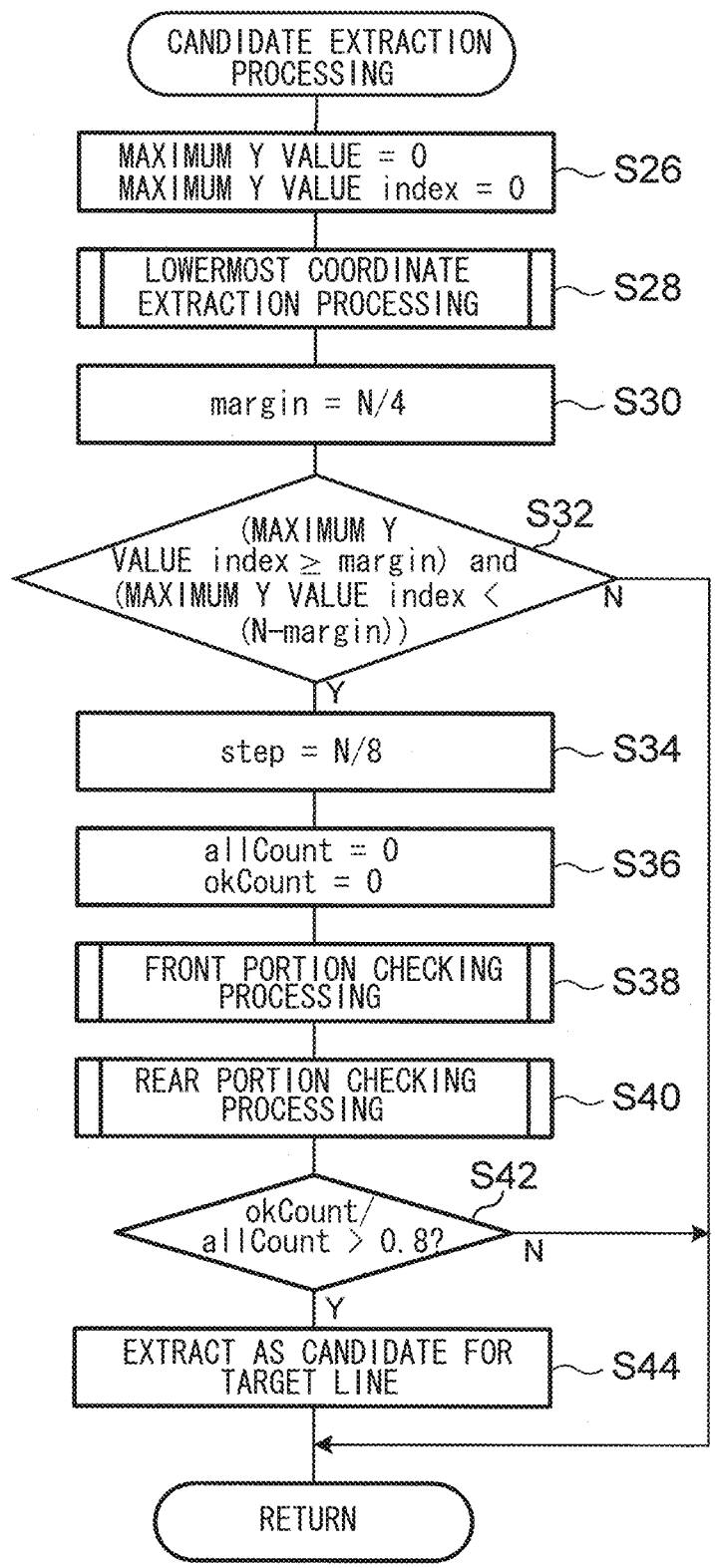
FIG. 8 is a flowchart illustrating an example of candidate extraction processing.

Next, at step S22, the extraction section 16 executes candidate extraction processing, illustrated in detail in FIG. 8, for each connected line, so as to extract connected lines that have a downward convex curved line shape. Note that an image coordinate system is employed in which the X coordinates increase on progression toward the right, and the Y coordinates increase on progression downward, with the top left hand pixel of the face image as the origin. As illustrated in FIG. 5, the coordinate lists recorded in the connected line list are recorded in ascending order of the X coordinate, in the sequence of the $0^{th}$ coordinate, the $1^{st}$ coordinate, and so on, up to the $N-1^{th}$ coordinate from the smallest X coordinate. Note that N refers to the total number of coordinates recorded in the coordinate lists contained in the respective connected line lists.

At step S26 of the candidate extraction processing illustrated in FIG. 8, the extraction section 16 sets a maximum Y value to 0, corresponding to the maximum Y coordinate value (Y value) out of the coordinates recorded in the coordinate lists contained in the connected line list representing all of the connected lines. The extraction section 16 moreover sets a maximum Y value index therefor to 0, to correspond to the index number of the maximum Y value coordinate in the coordinate list that includes the coordinate with the maximum Y value.

Figure 9:
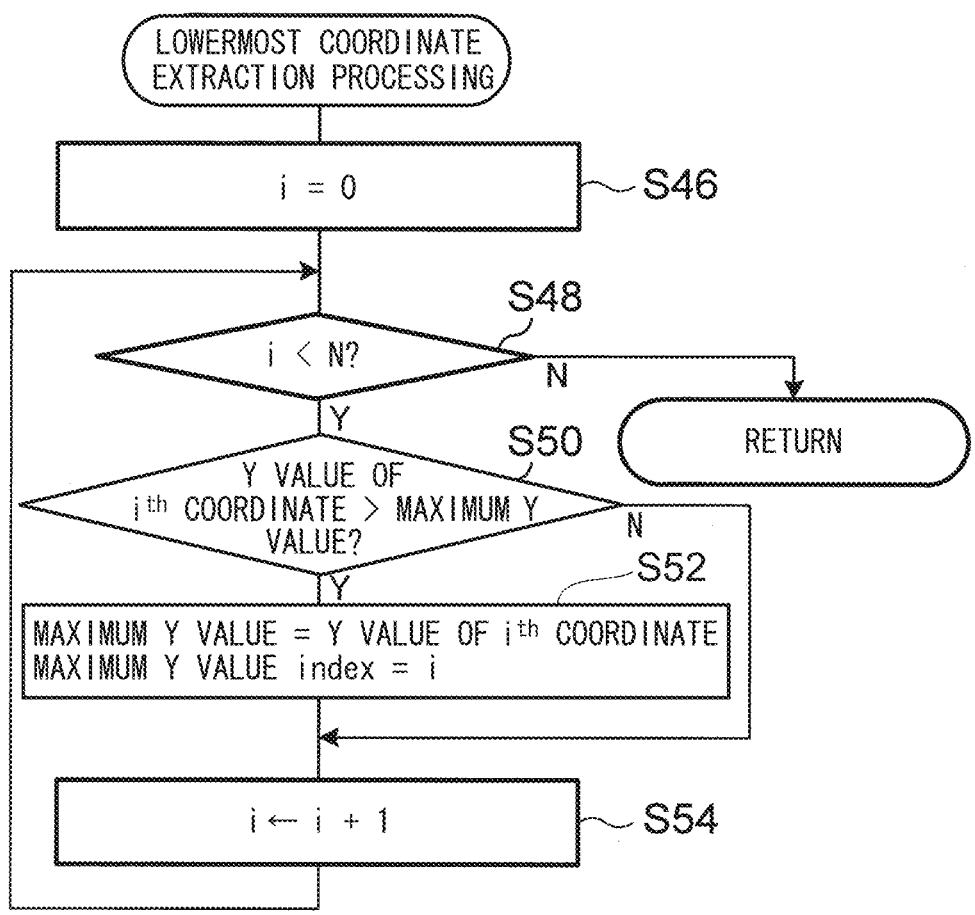
FIG. 9 is a flowchart illustrating an example of lowermost coordinate extraction processing.

Next, at step S28, the extraction section 16 executes lowermost coordinate extraction processing, illustrated in detail in FIG. 9.

At step S46 of the lowermost coordinate extraction processing illustrated in FIG. 9, the extraction section 16 sets a variable i to 0. Next, at step S48, the extraction section 16 determines whether or not i is smaller than N (the number of coordinates recorded in the coordinate list contained in the connected line list that is being processed). Processing transitions to step S50 when i<N.

At step S50, the extraction section 16 determines whether or not the Y value of the $i^{th}$ coordinate is greater than the set value of the maximum Y value. Processing transitions to step S52 when the Y value of the $i^{th}$ coordinate>the maximum Y value. At step S52, the extraction section 16 sets the Y value of the $i^{th}$ coordinate as the maximum Y value, and sets i as the maximum Y value index, before processing transitions to step S54. However, when the Y value of the $i^{th}$ coordinate<the maximum Y value, step S52 is skipped and processing transitions to step S54.

At step S54, the extraction section 16 increments i and processing returns to step S48. When the extraction section 16 determines that i≥N at step S48, processing returns to the candidate extraction processing. When this is performed, the coordinate identified by the i set as the maximum Y value index is extracted as the coordinate with the maximum Y value, namely as the lowermost coordinate.

Next, at step S30 of the candidate extraction processing illustrated in FIG. 8, the extraction section 16 computes a value of N divided by a specific value (for example "4") as a "margin". Next, at step S32, the extraction section 16 determines whether or not the lowermost coordinate extracted at step S28 is off-center toward an end portion of the connected line. When the lowermost coordinate is off-center toward an end portion of the connected line, there is a strong possibility of the connected line not being the target line representing the chin that is the detection target and so the connected line is not extracted as a target line candidate. For example, the extraction section 16 determines whether or not the maximum Y value index≥margin, and whether or not maximum Y value index<(N−margin). When determination is affirmative, the lowermost coordinate is determined to be centered, i.e. not off-center toward an end portion of the connected line, and processing transitions to step S34. When determination is negative, the lowermost coordinate is determined to be off-center toward an end portion of the connected line, and candidate extraction processing for the connected line is ended without extracting that connected line as a candidate for the target line.

At step S34, the extraction section 16 computes a value of N divided by a specific value (for example "8") as a "step". The "step" is a value for determining the degree of thinning to perform (how many coordinates to skip during processing) when thinning the coordinates recorded in the coordinate list during processing. Configuration may be made such that the step=1 when thinning is not performed and all of the coordinates are subject to processing.

Next, at step S36, the extraction section 16 respectively sets to 0 a variable allCount for counting coordinates subjected to processing, and a variable okCount for counting coordinates satisfying a downward convex curved line shape-forming condition out of the coordinates subject to processing.

Figure 10:
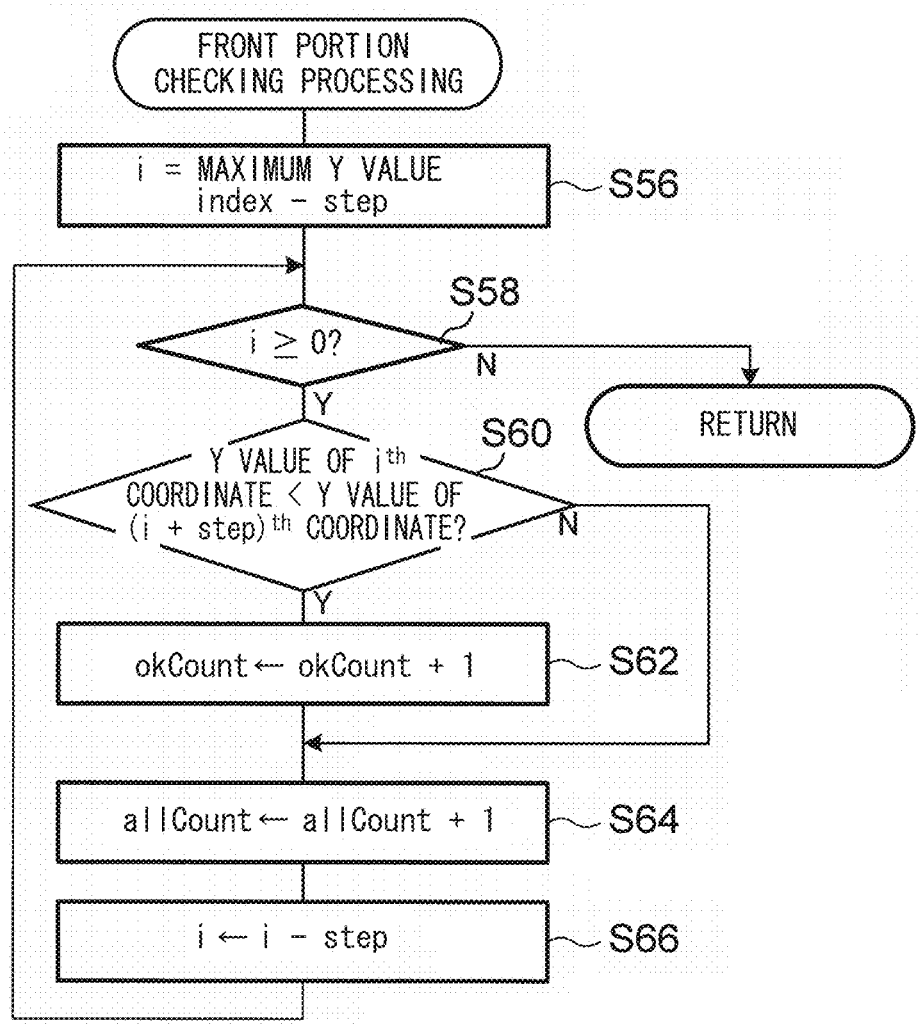
FIG. 10 is a flowchart illustrating an example of front portion checking processing.

Next, at step S38, the extraction section 16 executes front portion checking processing, illustrated in FIG. 10.

At step S56 of the front portion checking processing illustrated in FIG. 10, the extraction section 16 sets (maximum Y value index—step) as the variable i. Next, at step S58, the extraction section 16 determines whether or not i is 0 or greater. When i≥0, processing transitions to step S60.

At step S60, determination is made as to whether or not the Y value of the $i^{th}$ coordinate in the coordinate list is smaller than the Y value of the $(i+step)^{th}$ coordinate. When the Y value of the $i^{th}$ coordinate<the Y value of the $(i+step)^{th}$ coordinate, the $i^{th}$ coordinate is determined to be a coordinate satisfying the condition of forming a downward convex curved line shape, and processing transitions to step S62. At step S62, the extraction section 16 increments the okCount by 1, and transitions to step S64. However, when the Y value of the $i^{th}$ coordinate≥the Y value of the $(i+step)^{th}$ coordinate, the $i^{th}$ coordinate is determined to be a coordinate that does not satisfy the condition of forming a downward convex curved line shape, step S62 is skipped, and processing transitions to step S64.

At step S64, the extraction section 16 increments the allCount by 1. Next, at step S66, the extraction section 16 sets (i−step) as i, and returns to step S58. When the extraction section 16 determines that i<0 at step S58, determination as to whether or not the condition of forming a downward convex curved line shape is satisfied is ended for the front portion of the coordinate list, namely for coordinates with an X value smaller than the lowermost coordinate, and processing returns to the candidate extraction processing.

Figure 11:
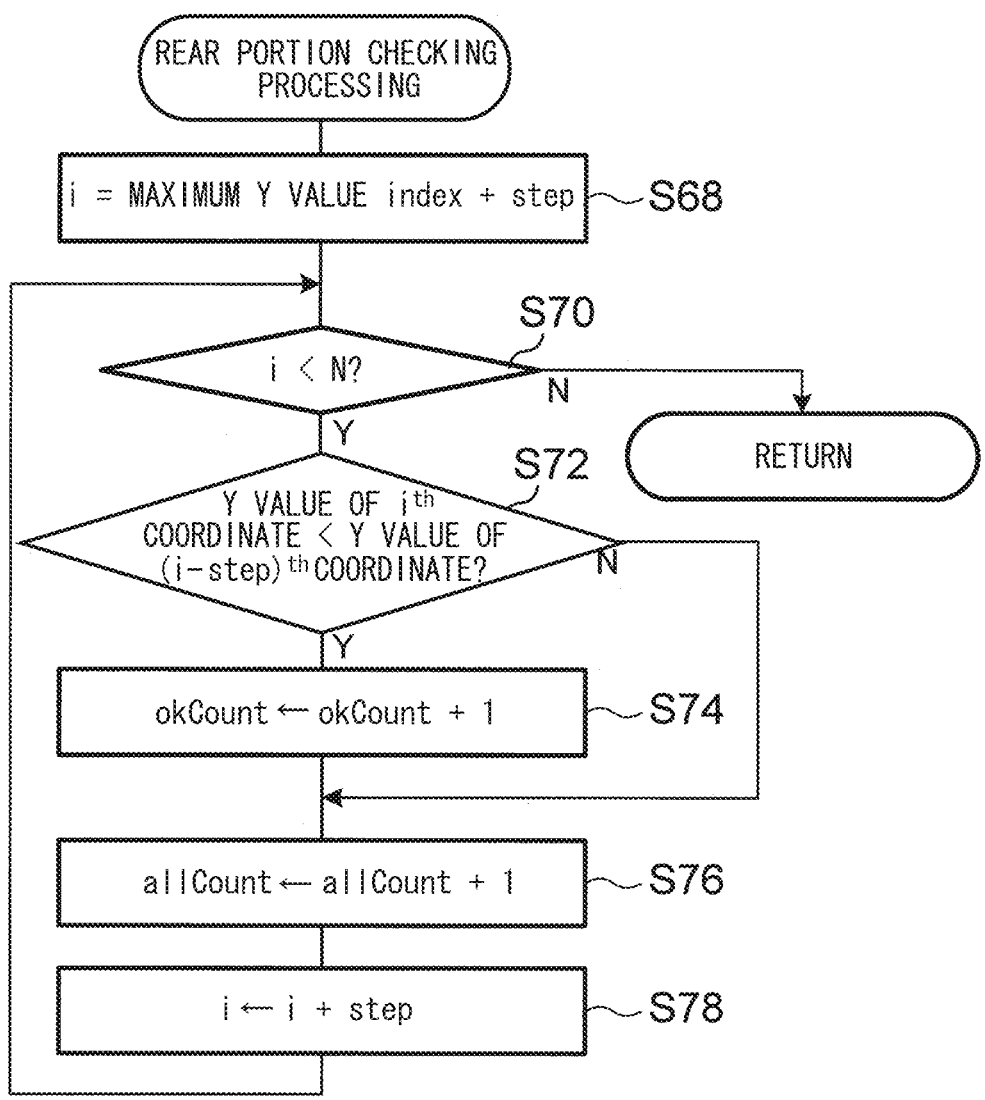
FIG. 11 is a flowchart illustrating an example of rear portion checking processing.

Next, at step S40 of the candidate extraction processing illustrated in FIG. 8, the extraction section 16 executes the rear portion checking processing illustrated in detail in FIG. 11.

At step S68 of the rear portion checking processing illustrated in FIG. 11, the extraction section 16 sets (maximum Y value index+step) as the variable i. Next, at step S70, the extraction section 16 determines whether or not i is smaller than N. When i<N, processing transitions to step S72.

At step S72, the extraction section 16 determines whether or not the Y value of the $i^{th}$ coordinate of the coordinate list is smaller than the Y value of the $(i-step)^{th}$ coordinate. When the Y value of the $i^{th}$ coordinate<the Y value of the $(i-step)^{th}$ coordinate, the $i^{th}$ coordinate is determined to be a coordinate satisfying the condition of forming a downward convex curved line shape, and processing transitions to step S74. Subsequent processing from step S74 to step S78 is similar to the processing from step S62 to step S66 of the front portion checking processing illustrated in FIG. 10. When the extraction section 16 determines that i≥N at step S70, determination as to whether or not the condition of forming a downward convex curved line shape is satisfied is ended for the rear portion of the coordinate list, namely for coordinates with an X value larger than the lowermost coordinate, and processing returns to the candidate extraction processing.

Next, at step S42 of the candidate extraction processing illustrated in FIG. 8, the extraction section 16 determines whether or not a specific proportion of the coordinates out of the coordinates contained in the connected line list satisfy the condition of forming a downward convex curved line shape. For example, the extraction section 16 determines whether or not okCount/allCount>0.8. When determination is affirmative, processing transitions to step S44, and the extraction section 16 extracts the connected line as a candidate for the target line. When determination is negative, candidate extraction processing for that connected line is ended without extracting the connected line as a candidate for the target line. Processing returns to the target line detection processing once determination as to whether or not to extract the connected line as a candidate for the target line has been completed for all of the connected lines.

Next, at step S24 of the target line detection processing illustrated in FIG. 7, out of the connected lines with downward convex curved line shapes extracted as target line candidates, the extraction section 16 uses the lengths recorded in the connected line list to extract the longest connected line as the target line that represents the chin. The detection result output section 18 then outputs the target line representing the chin extracted by the extraction section 16 as the detection result, and the target line detection processing is ended.

As explained above, the target line detection device 10 according to the first exemplary embodiment detects pixels corresponding to the transition points between pixels with an upward luminosity gradient, and pixels with a downward luminosity gradient, in consideration of the differences in the way light is incident to facial undulations. The connected lines, that connect together pixels corresponding to the transition points, are then extracted, and a target line representing the detection target is extracted from out of the extracted connected lines based on the shape and length of the connected lines. The target line can accordingly be extracted even at locations of weak color difference and luminosity contrast, enabling false detection of lines other than the detection target, such as moles or wrinkles, to be suppressed, and enabling the target line to be detected with good precision.

Note that in the first exemplary embodiment, explanation has been given regarding a case in which determination as to whether or not a connected line has a downward convex curved line shape is made based on the magnitude of coordinate values, however there is no limitation thereto. For example, a downward convex curved line simulating a chin that is the detection target may be prepared, and the curved line respectively fitted against extracted connected lines. Connected lines with a degree of matching of a specific value or greater may be determined to have a downward convex curved line shape.

Second Exemplary Embodiment

Next, explanation follows regarding a second exemplary embodiment. Similarly to the first exemplary embodiment, in the second exemplary embodiment explanation is given regarding a case in which a line representing a chin that is the detection target is detected in an image of a human face.

Figure 12:
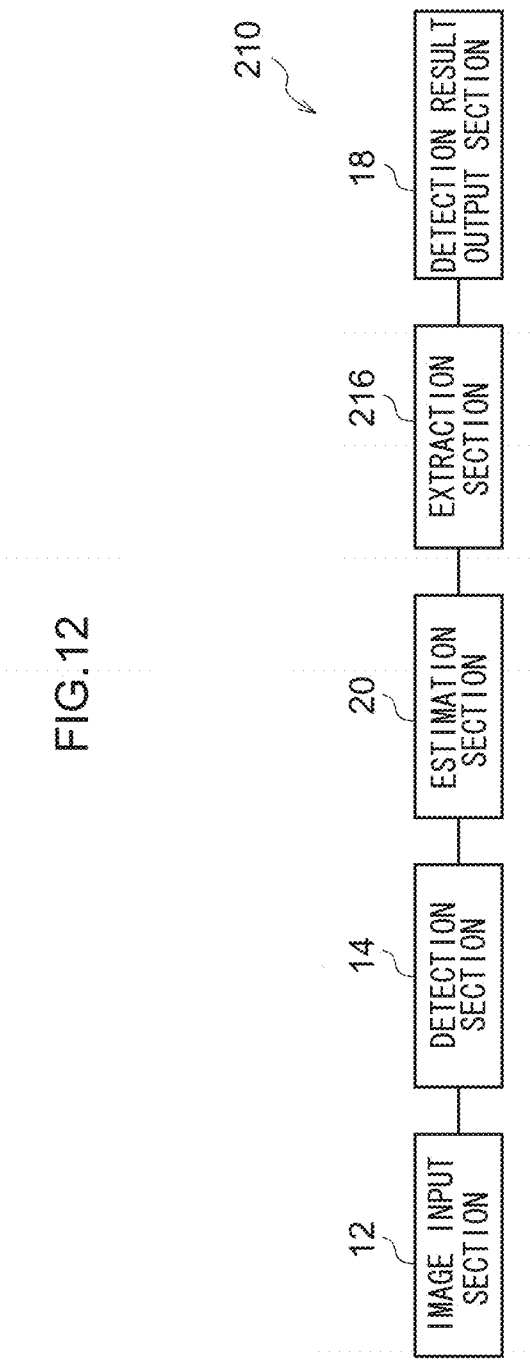
FIG. 12 is a block diagram illustrating a functional configuration of a target line detection device according to a second exemplary embodiment.

As illustrated in FIG. 12, a target line detection device 210 according to the second exemplary embodiment includes an image input section 12, a detection section 14, an estimation section 20, an extraction section 216, and a detection result output section 18. Note that portions similar to those of the target line detection device 10 according to the first exemplary embodiment are allocated the same reference numerals, and detailed explanation thereof is omitted.

Figure 13:
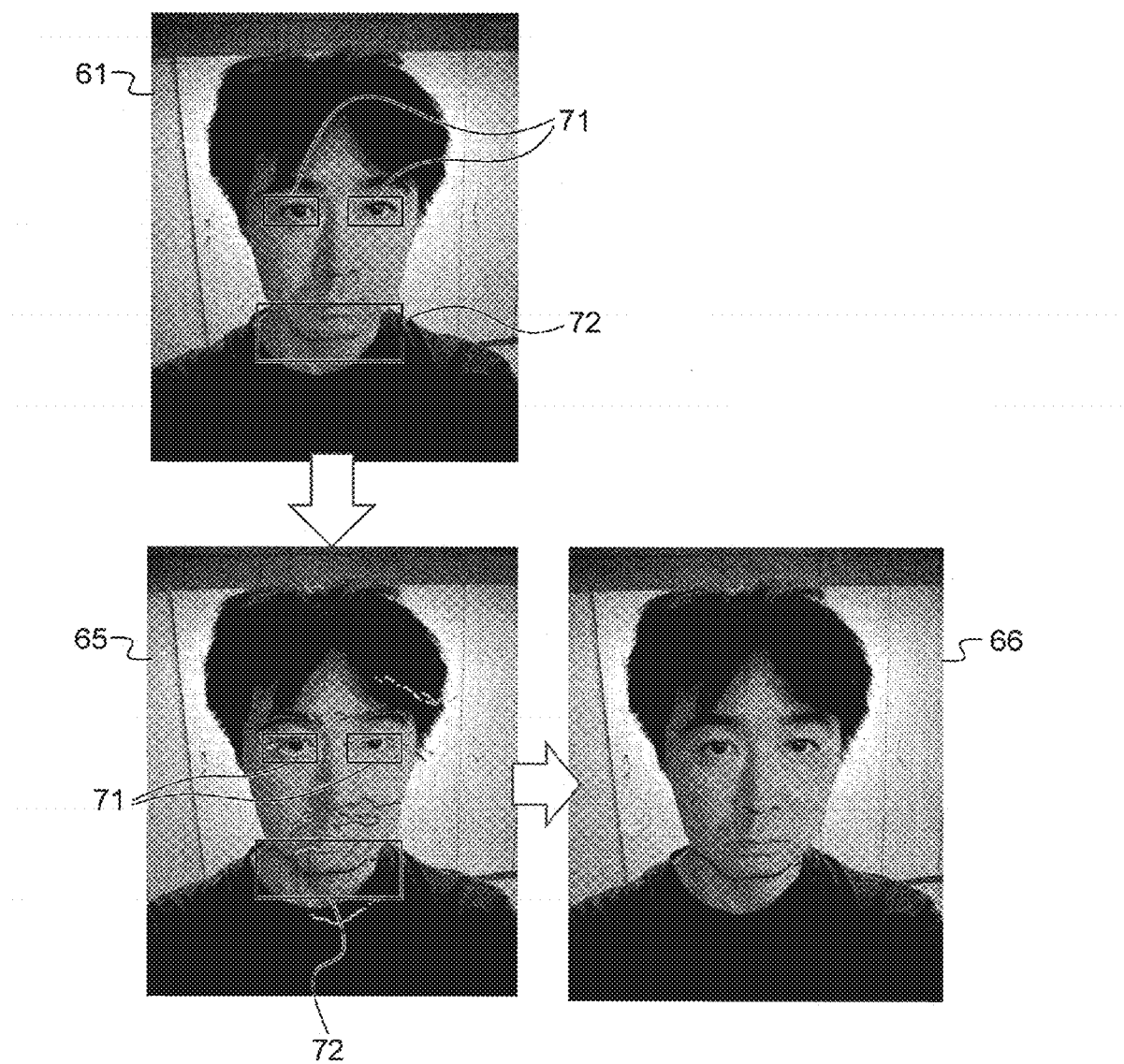
FIG. 13 is a drawing to explain estimation of a chin region.

As illustrated in FIG. 13, the estimation section 20 detects eye regions 71 in the face image or the brightness image 61, and estimates a chin region 72 based on the detection results for the eye regions 71. A known method, such as pattern matching using a dictionary, may, for example, be employed in detection of the eye regions 71. For the estimation of the chin region 72 based on the detection results of the eye regions 71, for example as illustrated in FIG. 13, the chin region 72 may be estimated below the eye regions 71, with a vertical width in a range of from 1 times to 1.5 times the distance between the centers of the two respective eye regions 71. The lateral width of the chin region 72 may be the width between outside vertical edges of the two eye regions 71.

Similarly to the extraction section 16 of the first exemplary embodiment, the extraction section 216 extracts connected lines connecting together pixels within a specific distance of each other from out of the pixels corresponding to transition points detected by the detection section 14. The extraction section 216 moreover extracts a target line representing the chin that is the detection target from out of the connected lines based on the shape or the length or a combination thereof of the extracted connected lines. When this is performed, out of the extracted connected lines, the extraction section 216 extracts the target line representing the chin that is the detection target from out of connected lines contained in the chin region 72 estimated by the estimation section 20.

The target line detection device 210 may be implemented by a computer 240, for example as illustrated in FIG. 6. The computer 240 includes a CPU 42, memory 44, a storage section 46, an input-output I/F 47, and a network I/F 48, connected together through a bus 49. The storage section 46 is stored with a target line detection program 250 that causes the computer 240 to function as the target line detection device 210. The CPU 42 reads the target line detection program 250 from the storage section 46, expands the target line detection program 250 in the memory 44, and sequentially executes the processes of the target line detection program 250.

The target line detection program 250 includes an image input process 52, a detection process 54, an estimation process 60, an extraction process 256, and a detection result output process 58. The CPU 42 operates as the estimation section 20 illustrated in FIG. 12 by executing the estimation process 60. The CPU 42 operates as the extraction section 216 illustrated in FIG. 12 by executing the extraction process 256. Other processes are similar to those of the target line detection program 50 of the first exemplary embodiment. The computer 240 executing the target line detection program 250 accordingly functions as the target line detection device 210.

Note that the target line detection device 210 may also be implemented by, for example, a semiconductor integrated circuit, more specifically by an ASIC or the like.

Figure 14:
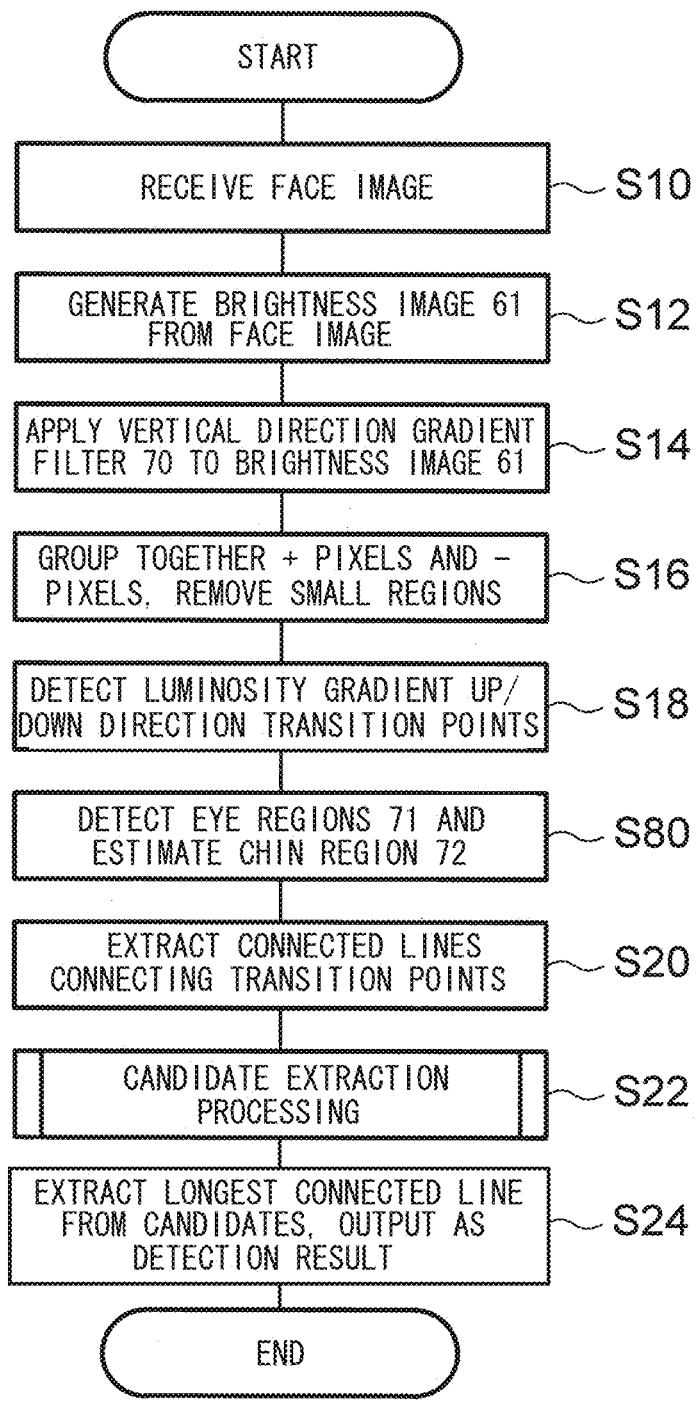
FIG. 14 is a flowchart illustrating an example of target line detection processing in the second exemplary embodiment.

Next, explanation follows regarding operation of the target line detection device 210 of the second exemplary embodiment. When a face image has been input into the target line detection device 210, the target line detection device 210 executes the target line detection processing illustrated in FIG. 14. Note that processing similar to the target line detection processing of the first exemplary embodiment is allocated the same reference numerals, and detailed explanation thereof is omitted.

When the processing of step S18 has been completed, processing transitions to step S80, and the estimation section 20 detects the eye regions 71 from the face image or the brightness image 61, and estimates the chin region 72 based on the detection results for the eye regions 71. Next, at step S20, the extraction section 216 extracts connected lines, connecting together pixels within a specific distance of each other, from out of pixels corresponding to the detected transition points. Next, at step S22, the extraction section 216 executes the candidate extraction processing illustrated in FIG. 8 for connected lines contained within the chin region 72 estimated at step S80. From out of the connected lines contained within the chin region 72, the extraction section 216 then extracts connected lines with a downward convex curved line shape as candidates for the connected line representing the chin that is the detection target.

Next, at step S24, the extraction section 216 extracts the longest of the connected lines extracted as candidates for the target line as the target line representing the chin that is the detection target and this is output as a detection result. Target line detection processing is then ended.

Note that in the target line detection processing described above, explanation has been given regarding a case in which transition points are detected in the entire brightness image, and connected lines connecting the transition points are extracted, before determining whether or not the connected lines contained within the estimated chin region are connected lines with a downward convex curved line shape. However, configuration may be made such that the chin region is estimated before extracting the connected lines, such that connected lines that connect together transition points within the chin region are extracted. Moreover, configuration may be made such that the chin region is estimated before detecting the transition points, such that transition points are detected within the chin region.

As described above, in the target line detection device 210 of the second exemplary embodiment, the line representing the detection target is extracted after estimating the region in which the detection target will be detected. Accordingly, a reduction in processing load is enabled in addition to the advantageous effects of the first exemplary embodiment, and false detection can be suppressed even when long downward protruding lines are captured in the background, for example.

Third Exemplary Embodiment

Next, explanation follows regarding a third exemplary embodiment. Similarly to the first exemplary embodiment, in the third exemplary embodiment explanation is given regarding a case in which a line representing a chin that is the detection target is detected in an image of a human face.

As illustrated in FIG. 1, a target line detection device 310 according to the third exemplary embodiment includes an image input section 12, a detection section 314, an extraction section 16, and a detection result output section 18. Note that portions similar to those of the target line detection device 10 according to the first exemplary embodiment are allocated the same reference numerals, and detailed explanation thereof is omitted.

Similarly to the detection section 14 of the first exemplary embodiment, the detection section 314 generates a brightness image in which only a brightness component is extracted from a face image received from the image input section 12. The detection section 314 applies a vertical direction gradient filter 70, such as that illustrated in FIG. 2, for example, to compute a top-bottom direction luminosity gradient strength for each pixel in the brightness image.

If the size of the vertical direction gradient filter 70 applied is not appropriate for the size of the face region contained in the face image, there are concerns of a drop in the computation precision of luminosity gradient strength, and of a drop in the detection precision of the target line. For example, if the size of the vertical direction gradient filter 70 is too large with respect to the size of the face region, the luminosity gradient strength values may incorporate noise. However, if the size of the vertical direction gradient filter 70 is too small with respect to the face region, the computed luminosity gradient strength may give localized values, such that the desired boundaries cannot be detected.

The detection section 314 accordingly varies the size of the face region, namely the size of the brightness image 61, or the size of the vertical direction gradient filter 70 or a combination thereof, such that the size of the face region and the size of the vertical direction gradient filter 70 are appropriate for one another.

Specifically, the detection section 314 uses a known method to detect a rectangular shaped face region, for example, in the brightness image 61. As illustrated in the upper part of FIG. 15, the detection section 314 selects a filter size corresponding to the size of the detected face region. The detection section 314 is capable of selecting the filter size by referring to a table such as the example illustrated in FIG. 16, in which appropriate correspondence relationships between the size of the face region and the filter size are defined in advance through testing or the like.

Figure 15:
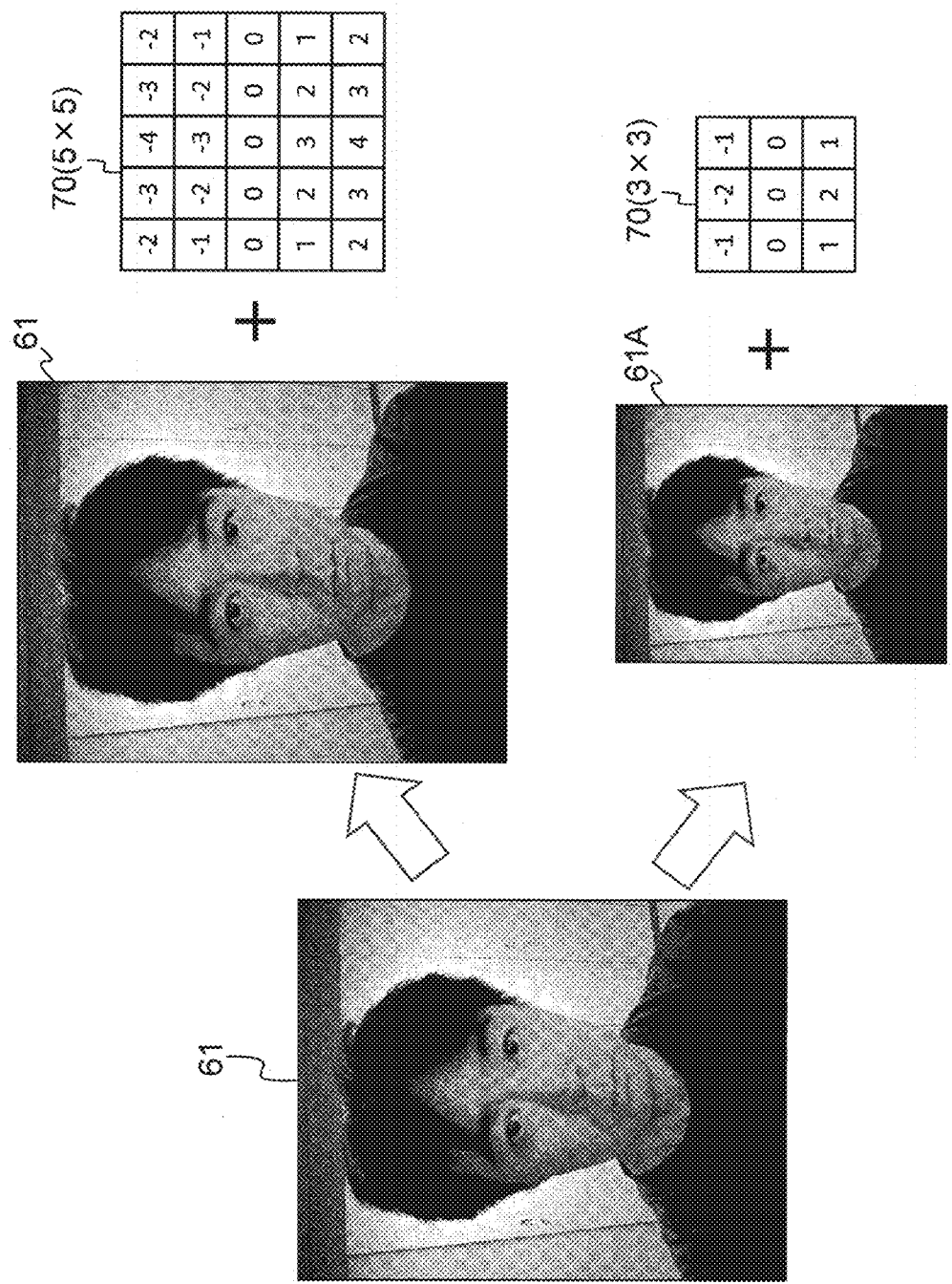
FIG. 15 is a drawing to explain modification of a face image size or filter size.

Alternatively, as illustrated in the lower part of FIG. 15, the detection section 314 computes an enlargement factor to bring the size of the detected face region to a size corresponding to the size of a provided filter, and employs the computed enlargement factor to modify the size of the brightness image 61 (61A in FIG. 15). The detection section 314 may also modify both the size of the brightness image 61 and the filter size so as to give an appropriate correspondence relationship between the size of the face region and the filter size.

The target line detection device 310 may be implemented by a computer 340, illustrated in FIG. 6, for example. The computer 340 includes a CPU 42, memory 44, a storage section 46, an input-output I/F 47, and a network I/F 48, connected together through a bus 49. The storage section 46 is stored with a target line detection program 350 that causes the computer 340 to function as the target line detection device 310. The CPU 42 reads the target line detection program 350 from the storage section 46, expands the target line detection program 350 in the memory 44, and sequentially executes the processes of the target line detection program 350.

The target line detection program 350 includes an image input process 52, a detection process 354, an extraction process 56, and a detection result output process 58. The CPU 42 operates as the detection section 314 illustrated in FIG. 1 by executing the detection process 354. Other processes are similar to those of the target line detection program 50 of the first exemplary embodiment. The computer 340 executing the target line detection program 350 accordingly functions as the target line detection device 310.

Note that the target line detection device 310 may also be implemented by, for example, a semiconductor integrated circuit, more specifically by an ASIC or the like.

Next, explanation follows regarding operation of the target line detection device 310 of the third exemplary embodiment. When a face image has been input into the target line detection device 310, the target line detection device 310 executes the target line detection processing illustrated in FIG. 7. However, the filter size modification processing illustrated in FIG. 17, or the image size modification processing illustrated in FIG. 18, is performed during application of the vertical direction gradient filter 70 to the brightness image 61 at step S14.

Figure 17:
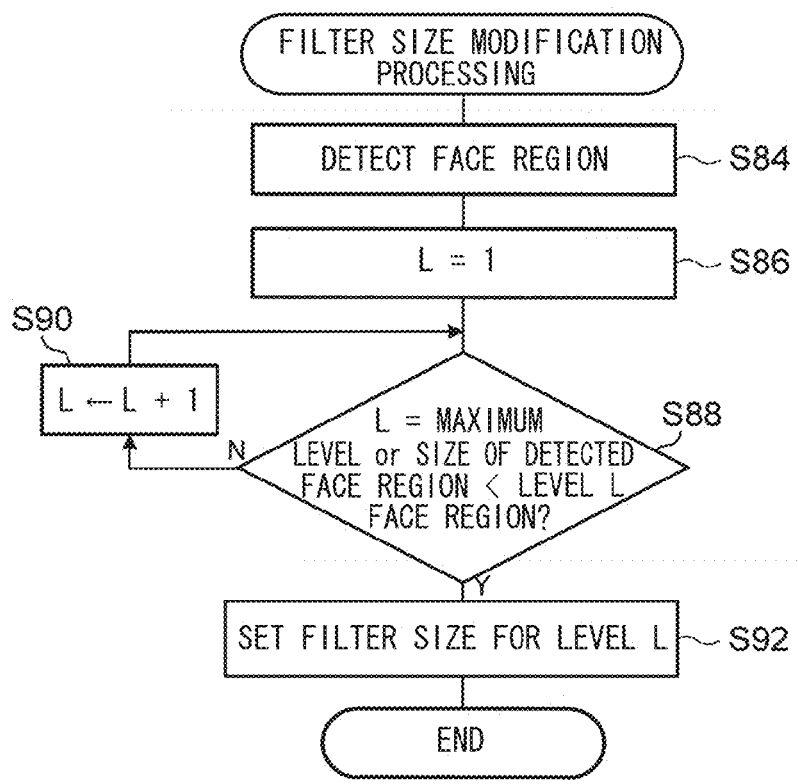
FIG. 17 is a flowchart illustrating an example of filter size modification processing.

At step S84 of the filter size modification processing illustrated in FIG. 17, the detection section 314 detects a rectangular shaped face region, for example, from the brightness image 61. Next, at step S86, the detection section 314 sets to 1 a variable L, representing a correspondence relationship level between the size of the face region and the filter size. Correspondence relationships between the size of the face region and the filter size, and the levels thereof, are defined in a table such as that illustrated in FIG. 16. In the example illustrated in FIG. 16, sizes of the face region and filter sizes are defined in ascending order as level 1, level 2, and so on.

Next, at step S88, the detection section 314 determines whether or not L is the maximum level defined in the table illustrated in FIG. 16, or, whether or not the size of the detected face region is smaller than the size of the face region of level L. When determination is affirmative, processing transitions to step S92, and the detection section 314 sets the level L filter size for the filter size of the vertical direction gradient filter 70 to be applied. However, processing transitions to step S90 when determination is negative at step S88, the detection section 314 increments L by 1, and processing returns to step S88.

Figure 18:
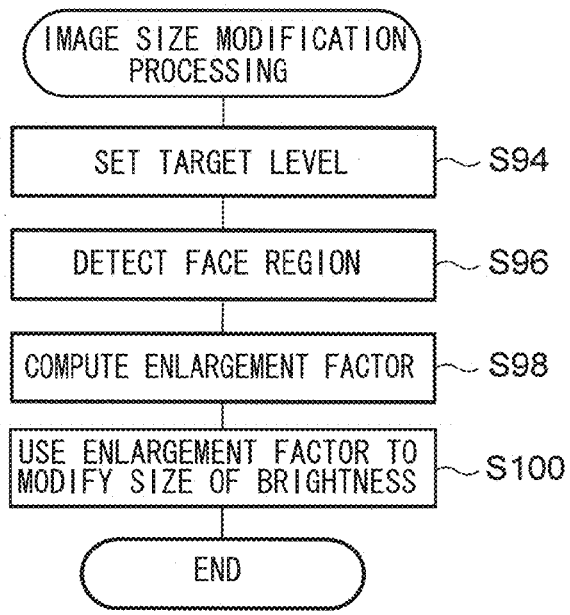
FIG. 18 is a flowchart illustrating an example of image size modification processing.

At step S94 of the image size modification processing illustrated in FIG. 18, the detection section 314 sets the level corresponding to the filter size of the vertical direction gradient filter 70 provided as a target level. Next, at step S96, the detection section 314 detects a rectangular shaped face region, for example, from the brightness image 61.

Next, at step S98, the detection section 314 computes an enlargement factor by dividing the size of the target level face region set at step S94 by the size of the face region detected at step S96. Next, at step S100, the detection section 314 modifies the size of the brightness image 61 such that the width and height of the brightness image 61 after modification are the following sizes:

width after modification=width prior to modification× square root of enlargement factor height after modification=height prior to modification×square root of enlargement factor As described above, in the target line detection device 310 according to the third exemplary embodiment, the size of the face region and the filter size are made to correspond appropriately. Accordingly, an increase in the computation precision of the luminosity gradient is enabled, and the detection precision of the target line is increased, in addition to the advantageous effects of the first exemplary embodiment.

Note that the third exemplary embodiment may be provided with an estimation section that estimates a region containing the detection target, as in the second exemplary embodiment.

Moreover, in the third exemplary embodiment, explanation has been given regarding a case in which the detection section 314 modifies the size of the brightness image when modifying the image size, however there is no limitation thereto. Configuration may be made such that the image input section modifies the face image to an appropriate size before being passed on to the detection section, using processing similar to that described above.

Fourth Exemplary Embodiment

Explanation follows regarding a fourth exemplary embodiment. In the fourth exemplary embodiment, explanation is given regarding a case in which lines representing laugh lines, serving as detection targets, are detected in an image of a human face.

As illustrated in FIG. 1, a target line detection device 410 according to the fourth exemplary embodiment includes an image input section 12, a detection section 414, an extraction section 416, and a detection result output section 18. Note that portions similar to those of the target line detection device 10 according to the first exemplary embodiment are allocated the same reference numerals, and detailed explanation thereof is omitted.

Figure 19:
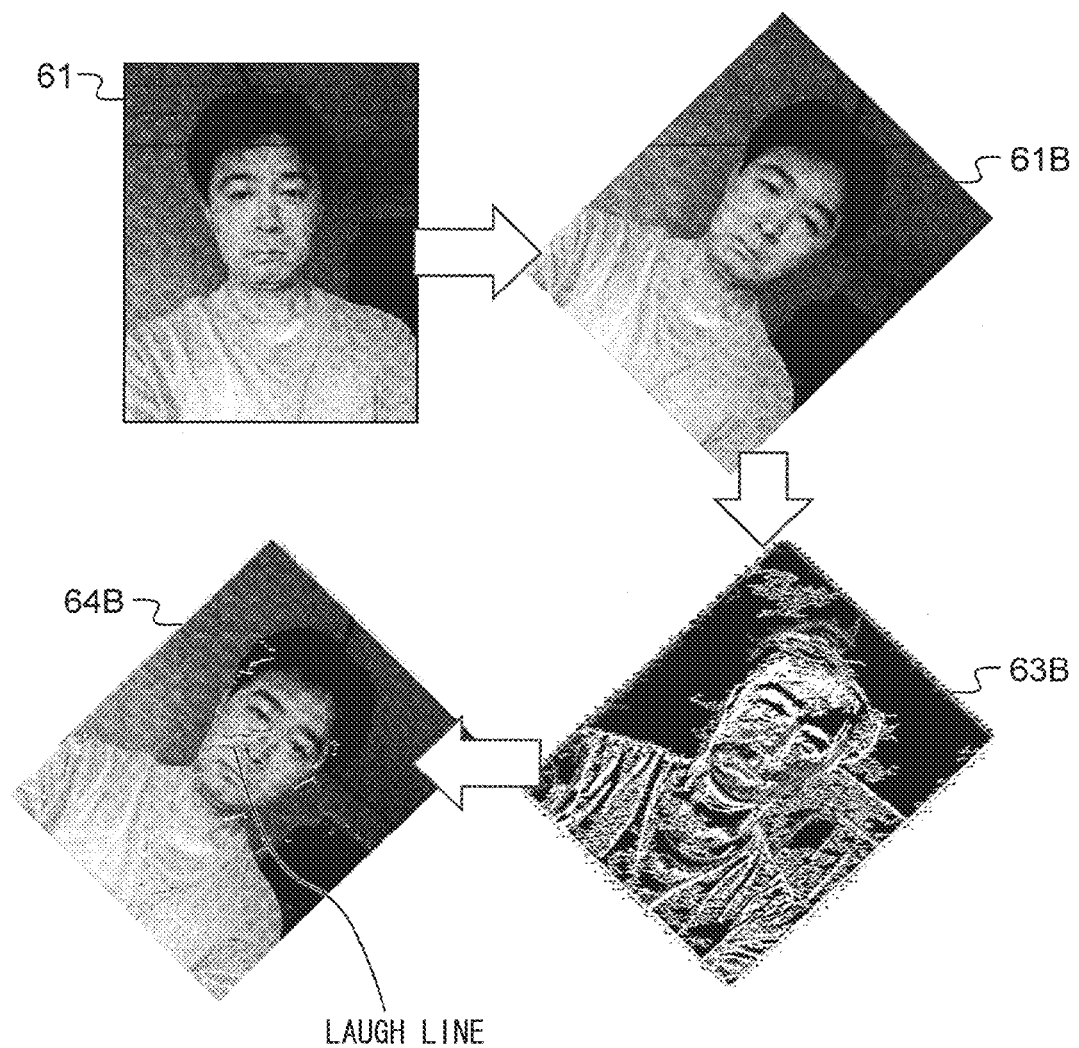
FIG. 19 is a drawing to explain detection of a line representing a laugh line.

The detection section 414 generates a brightness image, in which only a brightness component is extracted from a face image received from the image input section 12, similarly to the detection section 14 of the first exemplary embodiment. The detection section 414 applies a vertical direction gradient filter 70 such as that illustrated in FIG. 2, for example, to compute a top-bottom direction luminosity gradient strength for each pixel in the brightness image. When this is performed, as illustrated in FIG. 19, the detection section 414 rotates the brightness image 61 by a specific angle (61B in FIG. 19) such that the direction of the vertical direction gradient filter 70 (an upward direction or a downward direction in this example) intersects with a laugh line that is the detection target.

Laugh lines refer to lines extending from both sides of the nose to both ends of the lips, and are indentations at the periphery of the cheeks that appear as lines. The detection section 414 first detects two eye regions and a nose region from the brightness image 61. A known method, for example the method described in JP-A No. 2006-38689, may be employed for detection of the nose region. The detection section 414 rotates the brightness image such that out of the sides of a triangle shape connecting together the respective centers of the two eye regions and the nose region, the side connecting the right eye region to the nose region becomes vertical. The laugh line of the right cheek (on the left hand side in the face image) accordingly appears as an upward convex curved line shape extending in a substantially horizontal direction.

A region above the laugh line (toward the top of the rotated brightness image 61B) is a plane that retreats toward the rear on progression downward, and decreases in luminosity on progression downward. A region below the laugh line (toward the bottom of the rotated brightness image 61B) is a plane that projects out toward the front on progression downward, and increases in luminosity on progression downward. Namely, a boundary between the region of decreasing luminosity on progression from top to bottom in the brightness image 61B, and the region of increasing luminosity on progression from top to bottom in the brightness image 61B, appears over the laugh line. Accordingly, a boundary corresponding to the laugh line can be detected by applying the vertical direction gradient filter 70 illustrated in FIG. 2 to the rotated brightness image 61B (63B in FIG. 19).

Moreover, as described above, the region above the laugh line (toward the top of the rotated brightness image 61B) is a plane that retreats toward the rear on progression downward, and the region below the laugh line (toward the bottom of the rotated brightness image 61B) is a plane that projects out toward the front on progression downward. The detection section 414 accordingly detects transition points corresponding to the boundary between a region with negative luminosity gradient strength values to the upper side, and a region with positive luminosity gradient strength values to the lower side, similarly to when the chin is the detection target.

Moreover, when detecting the laugh line of the left cheek (on the right hand side in the face image), the detection section 414 rotates the brightness image 61 such that out of the sides of a triangle shape connecting together the respective centers of the two eye regions and the nose region, the side connecting the left eye region to the nose region becomes vertical.

From out of the pixels corresponding to transition points detected by the detection section 414, the extraction section 416 extracts connected lines connecting together pixels within a specific distance of each other (64B in FIG. 19), similarly to the extraction section 16 of the first exemplary embodiment. Moreover, from out of the extracted connected lines, the extraction section 416 extracts connected lines with an upward convex curved line shape as candidates for the target line. Whether or not there is an upward convex present may be determined by sequentially comparing the sizes of coordinate values, similarly to in the candidate extraction processing of the first exemplary embodiment. In cases in which plural connected lines that are candidates for the target line are present, the extraction section 416 extracts the connected line with coordinates closest to the nose region.

The target line detection device 410 may, for example, be implemented by a computer 440, illustrated in FIG. 6. The computer 440 includes a CPU 42, memory 44, a storage section 46, an input-output I/F 47, and a network I/F 48, connected together through a bus 49. The storage section 46 is stored with a target line detection program 450 that causes the computer 440 to function as the target line detection device 410. The CPU 42 reads the target line detection program 450 from the storage section 46 and expands it into the memory 44 to sequentially execute processes of the target line detection program 450.

The target line detection program 450 includes an image input process 52, a detection process 454, an extraction process 456, and a detection result output process 58. The CPU 42 operates as the detection section 414 illustrated in FIG. 1 by executing the detection process 454. The CPU 42 operates as the extraction section 416 illustrated in FIG. 1 by executing the extraction process 456. Other processes are similar to those of the target line detection program 50 of the first exemplary embodiment. The computer 440 executing the target line detection program 450 accordingly functions as the target line detection device 410.

Note that the target line detection device 410 may also be implemented by, for example, a semiconductor integrated circuit, more specifically by an ASIC or the like.

Figure 20:
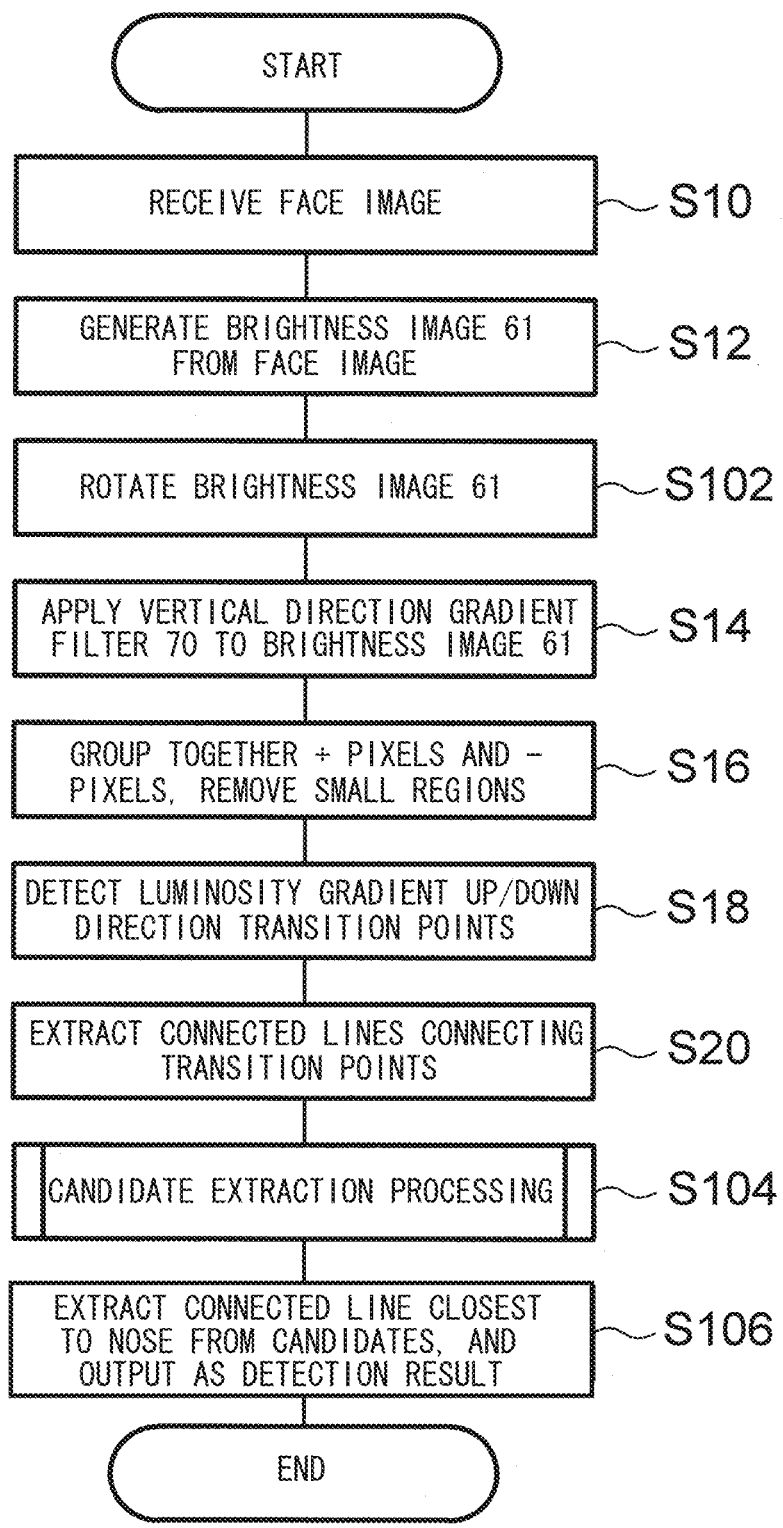
FIG. 20 is a flowchart illustrating an example of target line detection processing in a fourth exemplary embodiment.

Next, explanation follows regarding operation of the target line detection device 410 according to the fourth exemplary embodiment. When a face image has been input into the target line detection device 410, the target line detection device 410 executes the target line detection processing illustrated in FIG. 20. Note that processing similar to the target line detection processing of the first exemplary embodiment is allocated the same reference numerals, and detailed explanation thereof is omitted.

When the processing of step S12 has been completed, processing transitions to step S102. At step S102, the detection section 414 detects the two eye regions and the nose region in the brightness image 61. The detection section 414 then rotates the brightness image such that out of the sides of a triangle shape connecting together the respective centers of the two eye regions and the nose region, the side connecting the right eye region to the nose region becomes vertical.

Next, the processing of step S14 to S20 is executed similarly to in the target line detection processing of the first exemplary embodiment. Then, at step S104, the candidate extraction processing illustrated in FIG. 8 is executed. However, in the fourth exemplary embodiment, determination is made as to whether or not the connected line has an upward convex curved line shape. Accordingly, in the candidate extraction processing illustrated in FIG. 8, the maximum Y value is replaced by a minimum Y value, with a large value set as the initial minimum Y value (for example, the vertical width of the image, or an infinitely large value). Moreover, in the candidate extraction processing illustrated in FIG. 8, the lowermost coordinate is replaced by an uppermost coordinate (the smallest Y value out of the coordinates in the coordinate lists contained in the connected line list representing the connected lines).

At step S50 in FIG. 9, determination is made as to whether or not the Y value of the $i^{th}$ coordinate in the coordinate list<the minimum Y value. Moreover, at step S60 in FIG. 10, determination is made as to whether or not the Y value of the $i^{th}$ coordinate in the coordinate list>the Y value of the $(i-step)^{th}$ coordinate. Moreover, at step S72 in FIG. 11, determination is made as to whether or not the Y value of the $i^{th}$ coordinate in the coordinate list<the Y value of the $(i-step)^{th}$ coordinate.

Next, at step S106, from out of the connected lines that are candidates for the target line, the extraction section 416 extracts the connected line with the coordinates closest to the nose region as the target line representing the laugh line. The detection result output section 18 then outputs the target line representing the laugh line extracted by the extraction section 416 as a detection result, and the target line detection processing is ended.

As described above, the target line detection device 410 according to the fourth exemplary embodiment enables a target line to be detected with good precision when detecting laugh lines, similarly to when detecting the chin.

Note that in the fourth exemplary embodiment, explanation has been given regarding a case in which the brightness image or the face image is rotated such that the detection target line intersects with the direction of the gradient filter, however the gradient filter may be rotated before being applied to the brightness image. For example, the gradient filter may be rotated such that out of the sides of a triangle shape connecting together the respective centers of the two eye regions and the nose region, the side connecting the right eye region or the left eye region to the nose region is aligned with the direction of the gradient filter.

Moreover, the fourth exemplary embodiment may be provided with an estimation section that estimates a region containing the detection target, as in the second exemplary embodiment. The size of the face image or the filter size may also be modified such that the size of the face image and the filter size correspond appropriately to each other, as in the third exemplary embodiment.

In the first to the third exemplary embodiments, explanation has been given regarding a case in which the detection target is a chin, and in the fourth exemplary embodiment the detection target is a laugh line, however there is no limitation thereto. The technology disclosed herein may be applied to other detection targets provided that a line is formed at a boundary between a region with a luminosity gradient in a first direction, and a region with a luminosity gradient in a second direction that is opposite to the first direction. It is sufficient to extract lines appearing at boundaries where luminosity gradients transition, and then to determine whether or not the shape or the length or a combination thereof of such lines exhibits characteristics of the detection target.

Explanation has been given above in which the target line detection programs 50, 250, 350, 450 are stored in advance (installed) in the storage section 46, however they may also be provided in a format recorded on a storage medium such as a CD-ROM or a DVD-ROM.

An aspect has the advantageous effect of enabling a line representing a detection target to be detected with good precision even at locations of weak color difference and luminosity contrast.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A target line detection device comprising:
   a memory; and
   a processor configured to execute a process, the process comprising:
      detecting transition points in a brightness image obtained from a brightness component of an input image between pixels with a luminosity gradient in a first direction and pixels with a luminosity gradient in a second direction opposite to the first direction; and
      based on a shape or a length or a combination thereof, of lines connecting together transition points that are within a specific distance of each other, extracting a line representing a detection target from the lines connecting together the transition points.

2. The target line detection device of claim 1, wherein, in the process:
   in cases in which the detection target is a chin, when extracting the line representing the detection target, a line having a longest length out of lines with a downward convex curved line shape is extracted as the line representing the detection target from the lines that connect together the transition points.

3. The target line detection device of claim 2, the process further comprising:

estimating a position of the chin based on an eye position detection result; and when extracting the line representing the detection target, extracting the line representing the detection target from a region containing the estimated chin position.

4. The target line detection device of claim 1, wherein, in the process:

when applying a luminosity gradient filter to the brightness image to compute a luminosity gradient for each pixel, a size of the brightness image or a size of the luminosity gradient filter is modified based on a size of a face region contained in the brightness image.

5. A target line detection method comprising:

detecting transition points in a brightness image obtained from a brightness component of an input image between pixels with a luminosity gradient in a first direction and pixels with a luminosity gradient in a second direction opposite to the first direction; and by a processor, based on a shape or a length or a combination thereof, of lines connecting together transition points that are within a specific distance of each other, extracting a line representing a detection target from the lines connecting together the transition points.

6. The target line detection method of claim 5, wherein:

in cases in which the detection target is a chin, when extracting the line representing the detection target, a line having a longest length out of lines with a downward convex curved line shape is extracted as the line representing the detection target from the lines that connect together the transition points.

7. The target line detection method of claim 6, further comprising:

estimating a position of the chin based on an eye position detection result; and when extracting the line representing the detection target, extracting the line representing the detection target from a region containing the estimated chin position.

8. The target line detection method of claim 5, wherein:

when applying a luminosity gradient filter to the brightness image to compute a luminosity gradient for each pixel, a size of the brightness image or a size of the luminosity gradient filter is modified based on a size of a face region contained in the brightness image.

9. A non-transitory recording medium storing a program that causes a computer to execute a target line detection process, the process comprising:

detecting transition points in a brightness image obtained from a brightness component of an input image between pixels with a luminosity gradient in a first direction and pixels with a luminosity gradient in a second direction opposite to the first direction; and based on a shape or a length or a combination thereof, of lines connecting together transition points that are within a specific distance of each other, extracting a line representing a detection target from the lines connecting together the transition points.

10. The non-transitory recording medium of claim 9, wherein, in the target line detection process:

in cases in which the detection target is a chin, when extracting the line representing the detection target, a line having a longest length out of lines with a downward convex curved line shape is extracted as the line representing the detection target from the lines that connect together the transition points.

11. The non-transitory recording medium of claim 10, the target line detection process further comprising:

estimating a position of the chin based on an eye position detection result; and when extracting the line representing the detection target, extracting the line representing the detection target from a region containing the estimated chin position.

12. The non-transitory recording medium of claim 9, wherein, in the target line detection process:

when applying a luminosity gradient filter to the brightness image to compute a luminosity gradient for each pixel, a size of the brightness image or a size of the luminosity gradient filter is modified based on a size of a face region contained in the brightness image.

\* \* \* \* \*